United States Patent [19]
Takayuki et al.

[11] Patent Number: 5,363,243
[45] Date of Patent: Nov. 8, 1994

[54] ZOOM LENS SYSTEM

[75] Inventors: Ito Takayuki; Minefuji Nobutaka, both of Tokyo, Japan

[73] Assignee: Asahi Kogaku Kogyo Kabushiki Kaisha, Tokyo, Japan

[21] Appl. No.: 950,170

[22] Filed: Sep. 24, 1992

[30] Foreign Application Priority Data

Sep. 24, 1991 [JP] Japan .................. 3-315607

[51] Int. Cl.$^5$ ............................................. G02B 15/14
[52] U.S. Cl. .................................................. 359/689
[58] Field of Search ................................ 359/689, 686

[56] References Cited

U.S. PATENT DOCUMENTS

| | | |
|---|---|---|
| 4,773,744 | 9/1988 | Yamanshi . |
| 4,822,152 | 4/1989 | Yamanshi . |
| 4,840,467 | 6/1989 | Takada et al. . |
| 4,854,682 | 8/1989 | Yamanashi ............ 359/689 X |
| 4,978,204 | 12/1990 | Ito . |
| 5,069,536 | 12/1991 | Ogata ................... 359/689 X |

FOREIGN PATENT DOCUMENTS 63-159818  7/1988  Japan .
2251955A   7/1992  United Kingdom ........... 359/689 X Primary Examiner—Edward K. Look
Assistant Examiner—Michael S. Lee
Attorney, Agent, or Firm—Sughrue, Mion, Zinn, Macpeak & Seas

[57] ABSTRACT

An improved zoom lens system is disclosed which includes at least three lens groups which are arranged, in order from the object side, as a first lens group having a positive focal length, a second lens group having a positive focal length and a third lens group having a negative focal length. When zooming is carried out from the wide-angle to the narrow-angle end, the first, second and third lens groups are all moved towards the object so that the distance between the first and second lens groups is increased whereas the distance between the second and third lens groups is decreased. The system is characterized in that the second lens group has at least two aspheric surfaces.

18 Claims, 18 Drawing Sheets

ZOOM LENS SYSTEM

BACKGROUND OF THE INVENTION

The present application is based upon Japanese Patent Application No. Hei. 3-315607 filed Sep. 24, 1991, a disclosure of which is incorporated herein by reference.

The present invention relates generally to a zoom lens system that is suitable for use with compact cameras which have a smaller constraint on back focus than single-lens reflex cameras. More specifically, the present invention relates to a zoom lens system that features a high zoom ratio of 2.5 and more.

Various types of zoom lens systems have heretofore been known for use with compact cameras. Zoom lenses consisting of three lens groups or more with a zoom ratio exceeding 2 are categorized as follows:

(i) Four-group zoom lens system comprising four lens groups (positive, negative, positive and negative groups), with a stop diaphragm being provided between the second and third groups, all lens groups being moved independently of each other towards the object (this type includes a system where some of the four lens groups are moved in unison). Examples of such zoom lens systems are disclosed in Japanese Patent Laid-Open Publications No. SHO 63-43115, No. SHO 63-159818 and No. SHO 63-157120.

(ii) Three-group zoom lens system comprising three lens groups (positive, positive and negative groups), with a stop diaphragm being provided in the second group, all lens groups being moved independently of each other towards the object. Examples of this zoom lens system are disclosed in Japanese Patent Laid-Open Publications No. SHO 63-153511 and No. SHO 63-161423.

(iii) Three-group zoom lens system comprising three lens groups (positive, positive and negative groups), with a stop diaphragm being provided between the second and third groups, all lens groups being moved towards the object (see, for example, commonly assigned Japanese Patent Application Laid-Open No. HEI 2-73211).

(iv) Practically four-group zoom lens system that has the same composition as the system (iii) except that the second group is divided into a front and a rear group that are movable independently of each other (see Example 3 in the specification of commonly assigned Japanese Patent Application Laid-Open No. HEI. 2-73211, supra).

The above-described conventional zoom lens systems have their own problems. In the system (i), all of the four lens groups have to be moved independently of each other, so a large number of cams must be used; however, it is mechanistically difficult to accommodate those cams in the small space available for lenses for use with a compact camera.

The systems (i) and (ii) require that a shutter block also serving as a stop diaphragm be disposed either between the second and third lens groups (which are subject to substantial deterioration in performance due to manufacturing errors) or within the second group. Under the circumstances, high precision is required for the position of the shutter block while, at the same time, it is difficult to assure consistent optical performance since the imaging performance will be deteriorated greatly in the presence of slight errors.

Further, all systems (i) to (iv) have one problem in common; that is, the overall compactness of those systems is insufficient for using them with a compact camera and in each case, the overall system is composed of as many as 10 elements and more, with at least 5 elements being used in the second group.

The present invention has been accomplished under these circumstances of the prior art and has as an object providing a zoom lens system that features a high zoom ratio of 2.5 or more, that is short in the overall lens length, that is composed of a smaller number of lens elements and which hence is suitable for use with a compact camera.

SUMMARY OF THE INVENTION

The above-stated object of the present invention can be attained by a zoom lens system that includes at least three lens groups which are arranged, in order from the object side, as a first lens group having a positive focal length, a second lens group having a positive focal length and a third lens group having a negative focal length, wherein when zooming is carried out from the wide-angle to the narrow-angle end, the first, second and third lens groups are all moved towards the object so that the distance between the first second lens groups is increased whereas the distance between the second and third lens groups is decreased, which system is characterized in that the second lens group has at least two aspheric surfaces.

DESCRIPTION OF THE PREFERRED EMBODIMENTS

Figure 1:
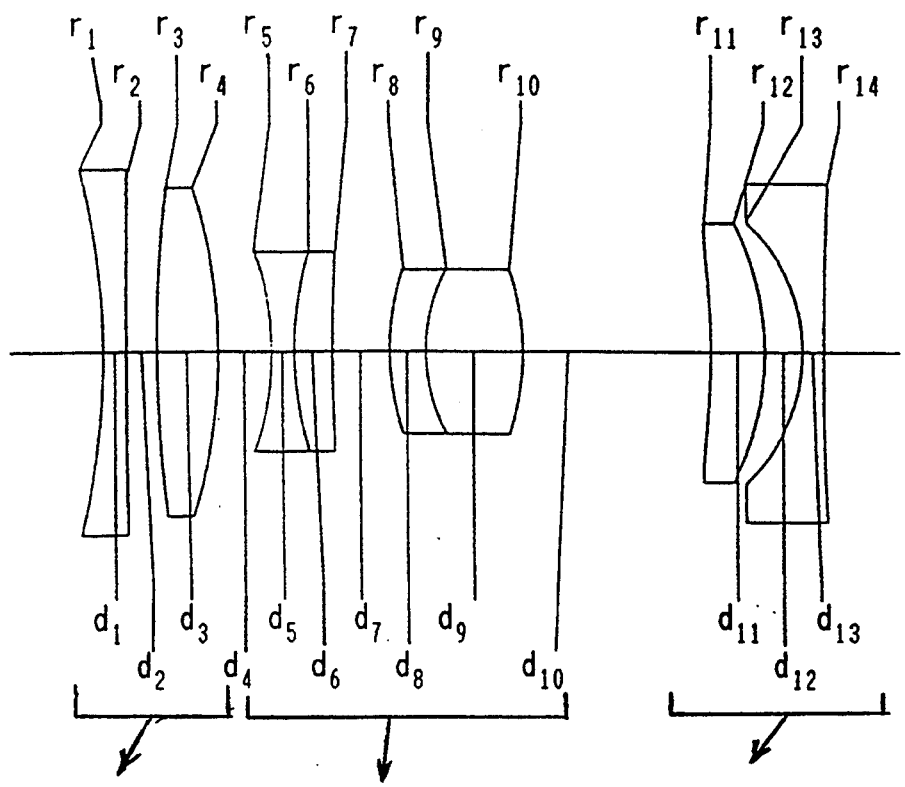
FIG. 1 is a simplified cross-sectional view of the zoom lens system according to Example 1 are the wide-angle end.

Examples of the present invention are described below.

Each of the zoom lens systems according to the examples of the present invention which are described hereinafter is one of a telephoto type that comprise, in order from the object side, a first lens group having a positive focal length, a second lens group of a great power having a positive focal length, and a third lens group having a negative focal length.

These zoom lens systems employ aspheric surfaces in the second lens group and successfully reduce the number of constituent lens elements and the overall lens length. Since the second lens group has a small lens diameter, aspheric surfaces can be easily fabricated.

The second lens group has such a great positive power that it is difficult to attain balance between spherical aberration and other aberrations solely by means of spherical surfaces. Thus, the second lens group has the following problems: if the lens diameter of the first lens group is reduced, the spherical aberration that develops in it tends to be undercorrected. On the other hand, the second lens group has a very great positive power, so it is difficult to attain balance between spherical and other aberrations that occur in the second lens group. It is therefore preferred that the spherical aberration that occurs in the second lens group be corrected by the divergent aspheric surface whereas all other aberrations be corrected by the aspheric surfaces, thereby attaining balance between all the aberrations that occur in the second lens group.

If the number of constituent lens elements is reduced, astigmatism is prone to be undercorrected and, hence, it is preferably corrected by aspheric surfaces.

If aspheric surfaces are also employed in the third lens group, the conventional lens arrangement which comprises, in order from the object side, a positive, a negative and a negative element can be simplified to a two-element composition that comprises a positive and a negative element or two negative elements.

The following is a supplemental discussion of the amount of variation in the coefficient of the third-order aberration due to an aspheric surface. The shape of an aspheric surface can generally be expressed by equation [1]:

$$x = \frac{cy^2}{1 + \sqrt{1 - (1 + K)c^2y^2}} + \alpha_4 y^4 + \alpha_6 y^6 + \alpha_8 y^8 + \alpha_{10} y^{10} + \ldots$$

where x is the distance by which the coordinates at the point on the aspheric surface where the height from the optical axis is y are departed from the plane tangent to the vertex of the aspheric surface; c is the curvature (1/r) of the vertex of the aspheric surface; K is the conic constant; and $\alpha_4$, $\alpha_6$, $\alpha_8$ and $\alpha_{10}$ are the aspheric coefficients of the fourth, sixth, eighth and tenth orders, respectively.

By calculating the focal length as f=1.0, namely, by substituting K=x/f, Y=y/f, C=fc, A4=$f^3\alpha_4$, A6=$f^5\alpha_6$, A8=$f^7\alpha_8$ and A10=$f^9\alpha_{10}$ into equation (1), the following equation (2) is obtained:

$$X = \frac{cy^2}{1 + \sqrt{1 - (1 + K)c^2y^2}} + A_4 y^4 + A_6 y^6 + A_8 y^8 + A_{10} y^{10} + \ldots$$

The second and subsequent terms of equation (2) define the amount of asphericity and the relationship between the coefficient A4 of the second term and the third-order aspheric coefficient $\phi$ is expressed by:

$$\phi = 8(N' - N)A_4$$

where N is the refractive index of the medium before the aspheric surface and N' is the refractive index of the medium after the aspheric surface.

The aspheric coefficient $\phi$ provides the following amounts of variation in third-order aberration coefficients as one may call in the theory of aberrations:

$\Delta I = h^4 \phi$
$\Delta II = h^3 H \phi$
$\Delta III = h^2 H^2 \phi$
$\Delta IV = h^2 H^2 \phi$
$\Delta V = h H^3 \phi$ where
I: spherical aberration coefficient;
II: coma coefficient;
III: astigmatism coefficient
IV: saqittal field curvature coefficient;
V: distortion coefficient;
h: the height of paraxial on-axis rays at which they pass through each lens surface; and
H: the height of paraxial off-axis rays passing through the center of the pupil, at which height they pass through each lens surface.

When aspheric surfaces are to be provided in the second lens group, the use of only one aspheric surface is insufficient to achieve a substantial reduction in the number of constituent lens elements. Therefore, it is preferred to provide at least two aspheric surfaces that satisfy the following conditions (a) and (b):

(a) $-40 < \Delta I2 < 0$ (b) $-4 < \Delta III2 < 0$ where
$\Delta I2$: the sum of variations in the coefficient of the third order spherical aberration due to all aspheric surfaces in the second lens group (the aberration coefficient is such as is calculated with the focal length of the overall system at the wide-angle end being taken as 1.0); and $\Delta III2$: the sum of variation in the coefficient of astigmatism due to all aspheric surfaces in the second lens group.

Condition (a) must be satisfied in order to correct spherical aberration effectively by aspheric surfaces. If the upper limit of this condition is exceeded, the aspheric surfaces are no longer effective in correcting spherical aberration. If the lower limit of condition (a) is not reached, overcorrection of spherical aberration occurs.

Condition (b) must be satisfied in order to correct astigmatism effectively by aspheric surfaces. If the upper limit of this condition is exceeded, the aspheric surfaces are no longer effective in correcting astigmatism. If the lower limit of condition (b) is not reached, overcorrection of astigmatism occurs.

In order to satisfy both conditions (a) and (b), at least two aspheric surfaces must be provided in the second lens group. If one aspheric surface is provided for each of the two lens elements that compose the second lens group, the respective aspheric surfaces can be designed to perform different functions. In addition, the individual lens element can be fabricated easily since they have an aspheric surface on only one side. On the other hand, it is difficult to fabricate a lens element having two aspheric surfaces since it is a bispheric lens having a large amount of asphericity; however, this is advantageous from an economic viewpoint.

A discussion is made below concerning the molding of aspheric lenses. When fabricating aspheric lenses by molding optical glass, the optical glass that can be used is limited since SF-glass is not suitable for use because of the difficulty involved in molding. Under the circumstances, the second lens group is preferably designed to comprise, in order from the object side, a sub-group $2a$ having a negative focal length and a sub-group $2b$ having a positive focal length, said sub-group $2a$ having an aspheric lens that satisfies the following conditions (c) and (d):

(c) $1.68 < N2a$ (d) $32 < \nu 2a$ where

N2a: the refractive index at the d-line of the aspheric lens in the sub-group $2a$; and $\nu 2a$: the Abbe number at the d-line of the aspheric lens in the sub-group $2a$.

Condition (c) specifies the refractive index of the aspheric lens in the sub-group $2a$. Effective correction of aberrations can be assured by composing the aspheric lens in the sub-group $2a$ of a high-index glass that satisfies this condition.

Condition (d) specifies the Abbe number of the aspheric lens in the sub-group $2a$. If the aspheric lens in the sub-group $2a$ is made of an optical material the Abbe number of which satisfies this condition, the lens can be molded easily, which is more preferred for the purposes of the present invention.

In the examples, all lens systems are described as falling within the category of "three-group" type; it should, however be noted that the second lens group may be considered to consist of two sub-groups and, in this respect, the applicability of the preset invention will extend to the four-group zoom lens system that is described in the background part of this specification. Likewise, a three-group zoom lens system in which the last lens group is followed by a rear lens group having a smaller power is also included within the scope of the present invention.

The stop diaphragm may be positioned either within the second lens group or behind it. In the former case, the diameter of the front group can be reduced but, on the other hand, difficulty is involved in designing an effective lens composition. In the latter case (where the stop diaphragm is positioned between the second and third lens groups), the lens block can be separated from the shutter block, contributing to the realization of a simple mechanistic structure.

Examples 1 to 9 of the zoom lens system of the present invention are described below with reference to data sheets, in which f denotes the focal length, fB the back focus, r the radius of curvature of an individual lens surface (or the curvature radius of the vertex in the case of an aspheric surface), d the lens thickness or the airspace between lenses (the foregoing parameters are in millimeters), FNO the F number, $\omega$ the half view angle (in degrees), n the refractive index of an individual lens at the d-line, and $\nu$ the Abbe number of an individual lens at the d-line. In each data sheet, aspheric surfaces are distinguished from spherical surfaces by putting an asterisk after surface number, and A4, A6 and A8 denote the aspheric coefficients of the fourth, sixth and eighth orders, respectively.

EXAMPLE 1

Figure 2A:
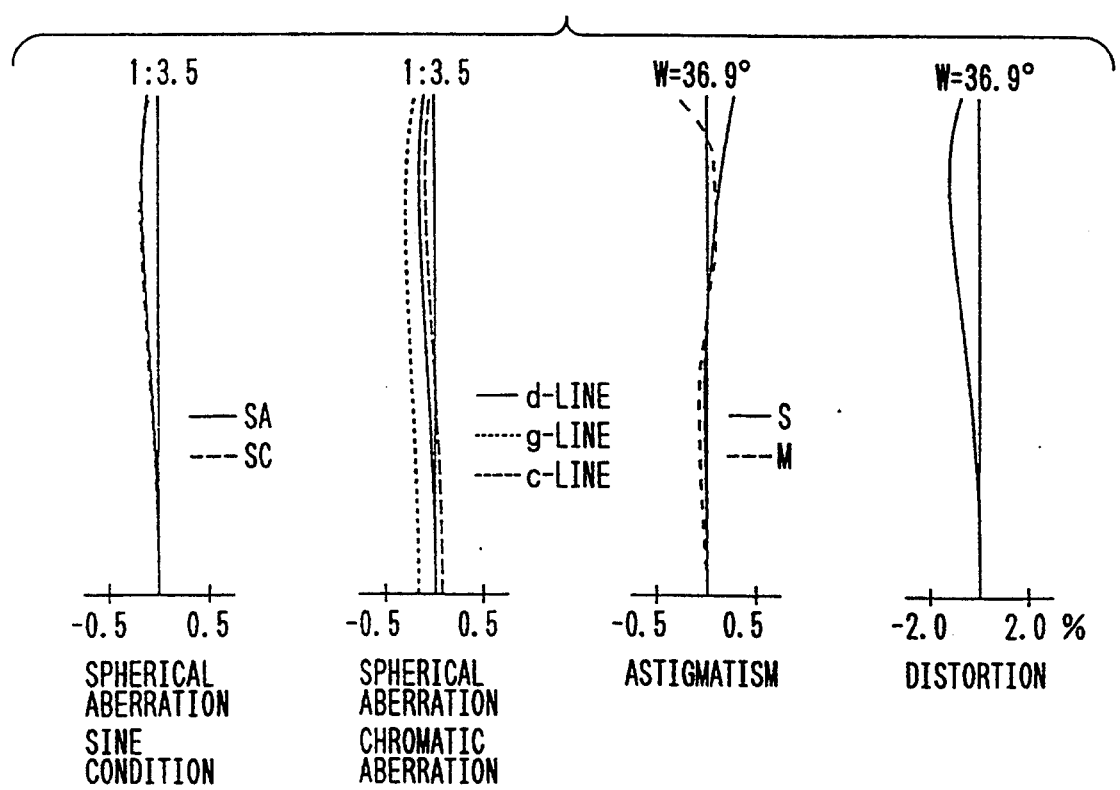
FIG. 2 is a set of graphs plotting the aberration curves obtained with the zoom lens system of Example 1.
Figure 2B:
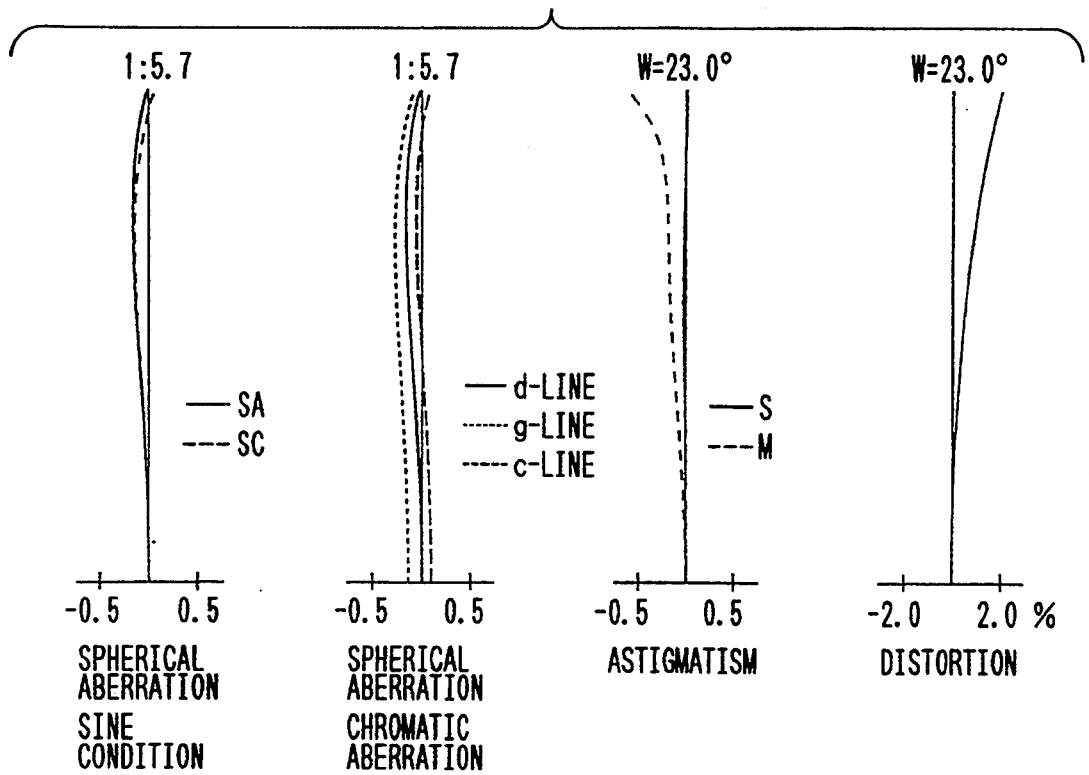
Figure 2C:
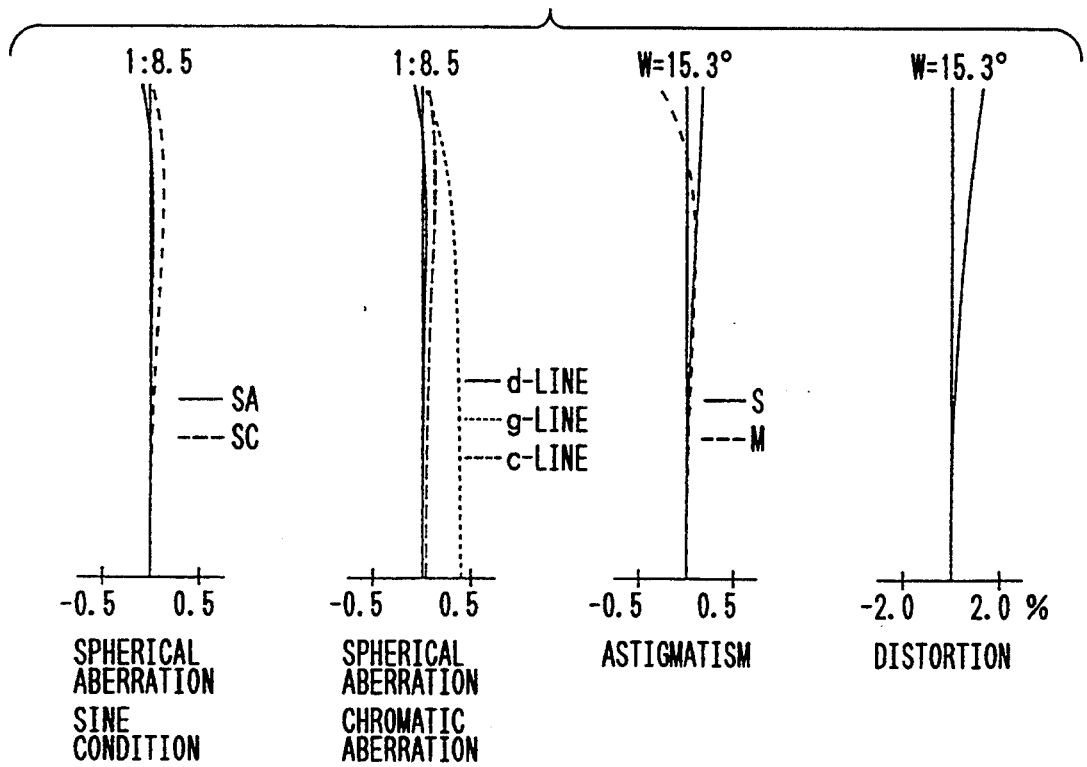

FIG. 1 is a simplified cross-sectional view of the zoom lens system according to Example 1 at the wide-angle end. Specific data for example are as shown in Table 1. The aberration curves obtained with this lens system are plotted in FIGS. 2(a), 2(b) and 2(c).

TABLE 1

| Surface No. | r | d | n | $\nu$ |
|---|---|---|---|---|
| \multicolumn{5}{l}{FNO. = 1:3.6, f = 29.00, $\omega$ = 36.9, fB = 8.30} |
| 1 | −48.126 | 1.50 | 1.83400 | 37.2 |
| 2 | −827.145 | 2.02 | | |
| 3 | 86.943 | 4.00 | 1.69680 | 55.5 |
| 4 | −35.944 | variable | | |
| 5* | −21.729 | 1.50 | 1.73077 | 40.5 |
| 6 | 21.987 | 2.43 | 1.80518 | 25.4 |
| 7 | 109.603 | 3.85 | | |
| 8 | 16.557 | 2.30 | 1.80518 | 25.4 |
| 9 | 11.098 | 6.38 | 1.58913 | 61.2 |
| 10* | −16.145 | variable | | |
| 11* | −44.354 | 3.42 | 1.68893 | 31.1 |
| 12 | −19.176 | 2.50 | | |
| 13 | −11.580 | 1.40 | 1.77250 | 49.6 |
| 14 | 228.880 | | | |

| Fifth surface: aspheric | Tenth surface: aspheric |
|---|---|
| K = 0 | K = 0 |
| A4 = 0.40328626 × 10$^{-4}$ | A4 = 0.76751422 × 10$^{-4}$ |
| A6 = 0.30242012 × 10$^{-6}$ | A6 = 0.92777629 × 10$^{-7}$ |
| A8 = 0.14154205 × 10$^{-8}$ | A8 = 0.14241736 × 10$^{-8}$ |

| Eleventh surface: aspheric |
|---|
| K = 0 |
| A4 = 0.44758114 × 10$^{-4}$ |
| A6 = 0.22807597 × 10$^{-6}$ |
| A8 = 0.64325486 × 10$^{-9}$ |

The values of Fno., f, fB, $\omega$, d4 and d10 vary with zooming as shown in Table 2.

TABLE 2

| FNo. | 3.6 | 5.9 | 8.5 |
|---|---|---|---|
| f | 29.00 | 50.02 | 78.08 |
| fB | 8.30 | 28.17 | 53.94 |
| ω | 36.9 | 23.0 | 15.3 |
| d4 | 3.36 | 6.90 | 9.69 |
| d10 | 12.25 | 6.00 | 2.75 |

EXAMPLE 2

Figure 3:
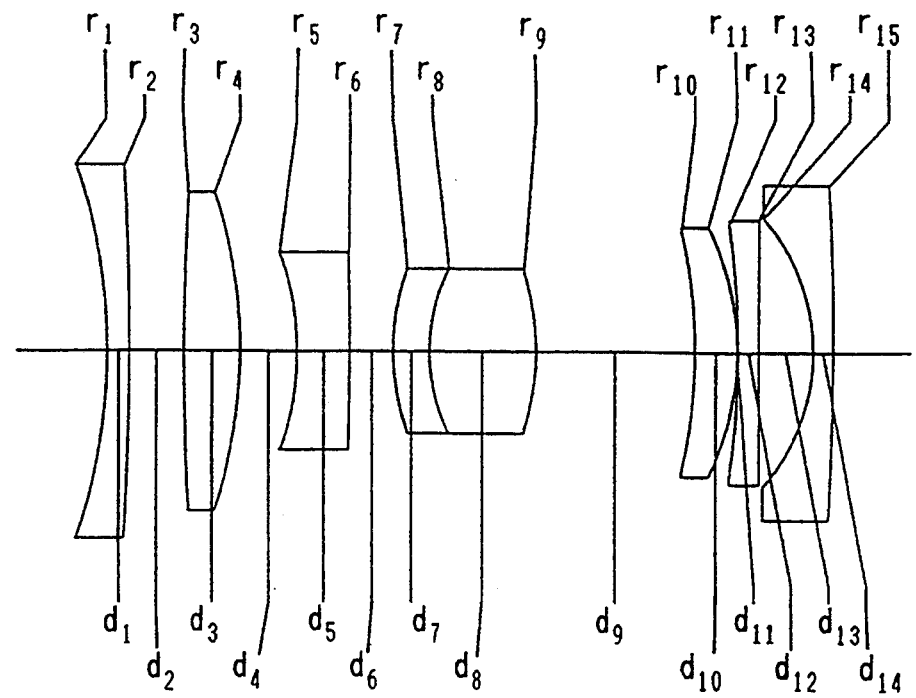
FIG. 3 is a simplified cross-sectional view of the zoom lens system according to Example 2 at the wide-angle end.
Figure 4A:
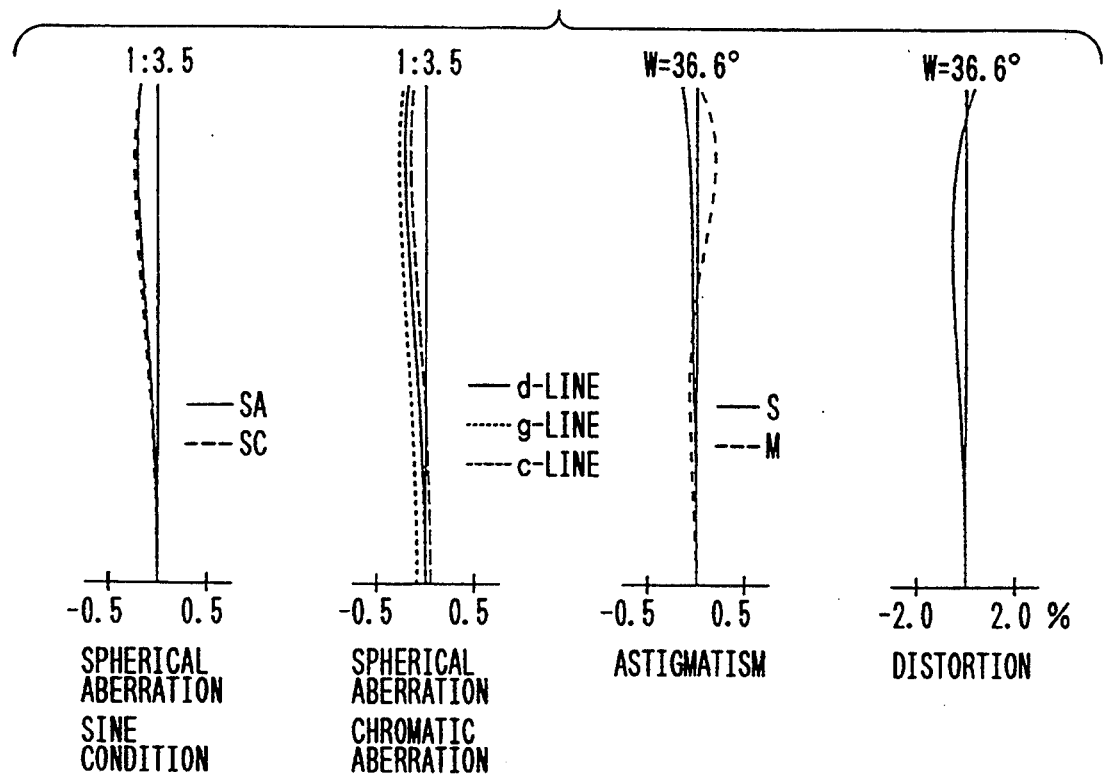
FIG. 4 is a set of graphs plotting the aberration curves obtained with the zoom lens system of Example 2.
Figure 4B:
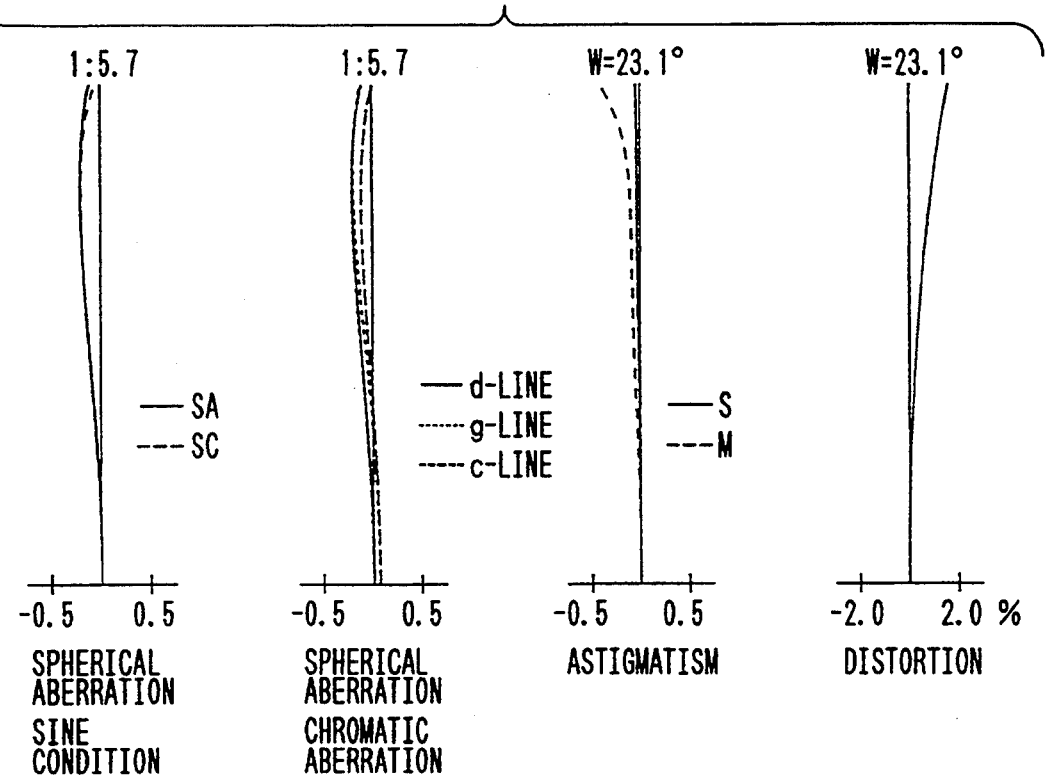
Figure 4C:
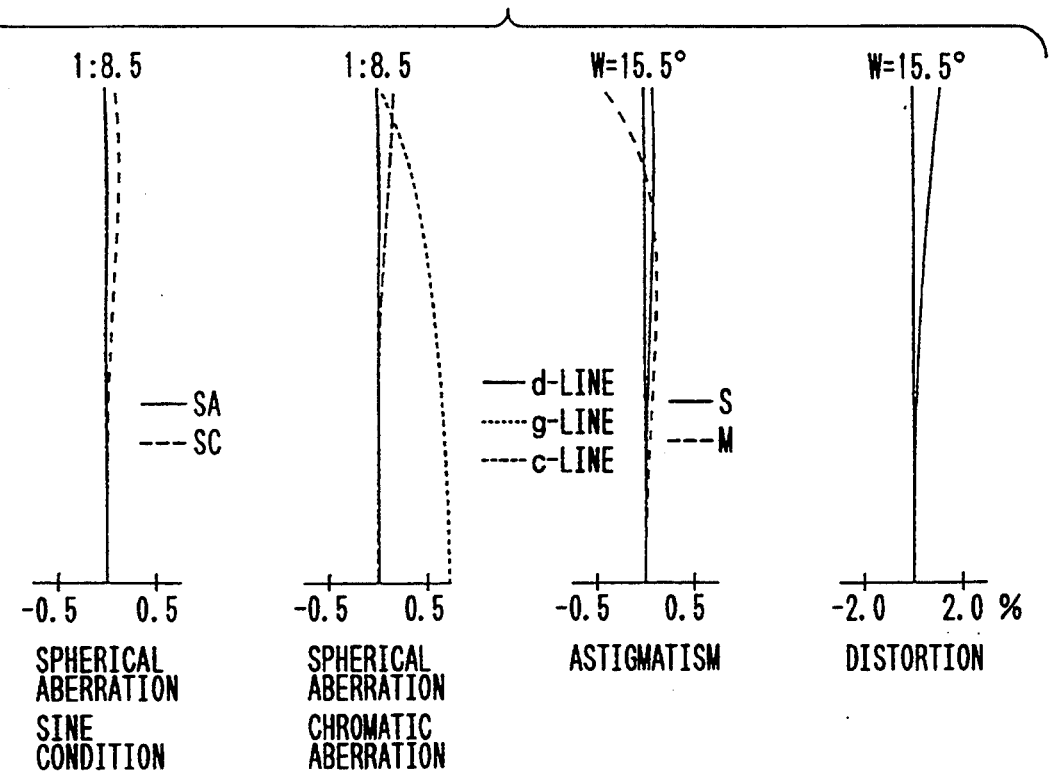

FIG. 3 is a simplified cross-sectional view of the zoom lens system according to Example 2 at the wide-angle end. Specific data for this example are as shown in Table 3. The aberration carvers obtained with this lens system are plotted in FIGS. 4(a), 4(b) and 4(c).

TABLE 3

FNO. = 1:3.6, f = 29.00, ω = 36.6, fB = 8.10

| Surface No. | r | d | n | ν |
|---|---|---|---|---|
| 1 | −36.990 | 1.50 | 1.80400 | 46.6 |
| 2 | −202.084 | 3.60 | | |
| 3 | 165.024 | 3.80 | 1.69680 | 55.5 |
| 4 | −31.924 | variable | | |
| 5* | −19.914 | 3.49 | 1.80400 | 46.6 |
| 6 | −207.063 | 2.84 | | |
| 7 | 16.820 | 2.30 | 1.80518 | 25.4 |
| 8 | 11.942 | 6.67 | 1.58913 | 61.2 |
| 9* | −16.085 | variable | | |
| 10 | −34.131 | 2.78 | 1.80518 | 25.4 |
| 11 | −18.175 | 0.10 | | |
| 12 | −54.094 | 1.30 | 1.77250 | 49.6 |
| 13 | 1968.945 | 3.61 | | |
| 14 | −13.182 | 1.40 | 1.83481 | 42.7 |
| 15 | −185.635 | | | |

| Fifth surface: aspheric | Ninth surface: aspheric |
|---|---|
| K = 0 | K = 0 |
| $A_4 = -0.40328626 \times 10^{-4}$ | $A_4 = 0.76751422 \times 10^{-4}$ |
| $A_6 = -0.30242012 \times 10^{-6}$ | $A_6 = 0.92777629 \times 10^{-7}$ |
| $A_8 = 0.14154205 \times 10^{-8}$ | $A_8 = 0.14241736 \times 10^{-8}$ |

The values of Fno., f, fB, ν, d4 and d9 vary with zooming as shown in Table 4 below.

TABLE 4

| FNo. | 3.6 | 6.0 | 8.5 |
|---|---|---|---|
| f | 29.00 | 50.00 | 77.30 |
| fB | 8.10 | 27.19 | 51.18 |
| ω | 36.6 | 23.1 | 15.5 |
| d4 | 3.79 | 6.98 | 9.74 |
| d9 | 10.63 | 5.15 | 2.35 |

EXAMPLE 3

Figure 5:
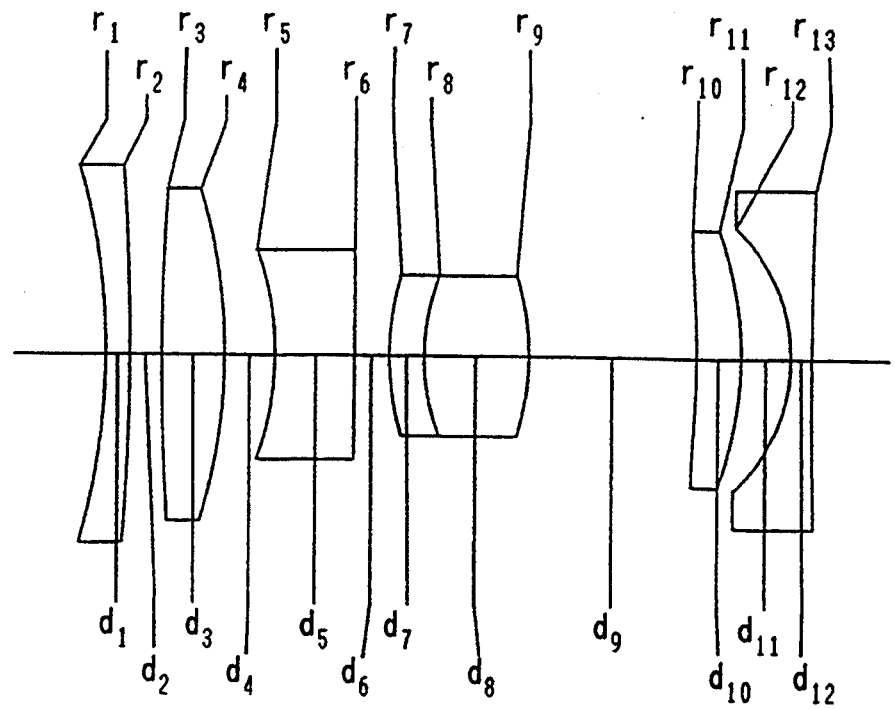
FIG. 5 is a simplified cross-sectional view of the zoom lens system according to Example 3 at the wide-angle end.
Figure 6A:
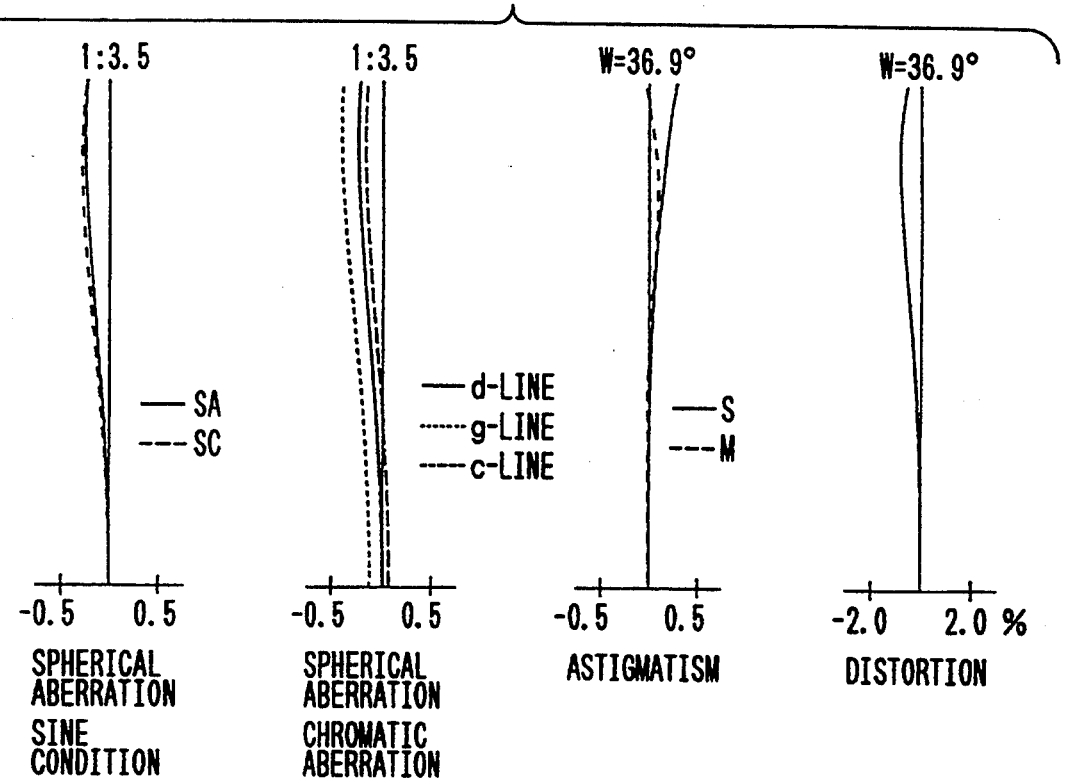
FIG. 6 is a set of graphs plotting the aberration curves obtained with the zoom lens system of Example 3.
Figure 6B:
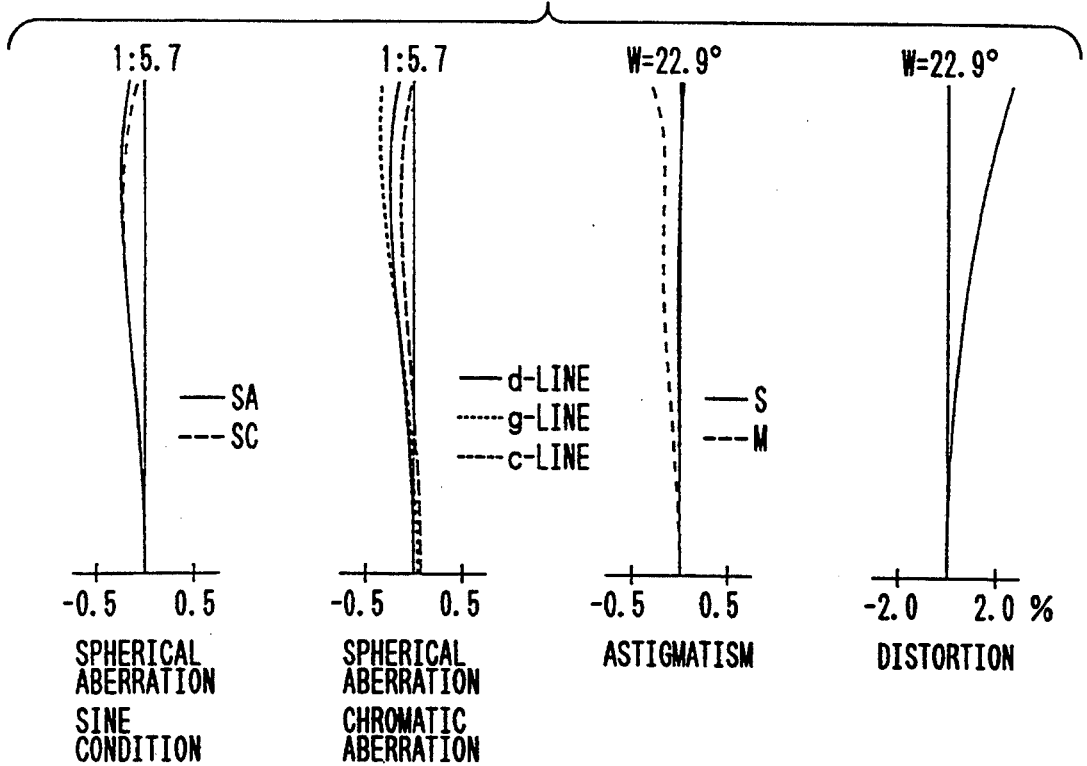
Figure 6C:
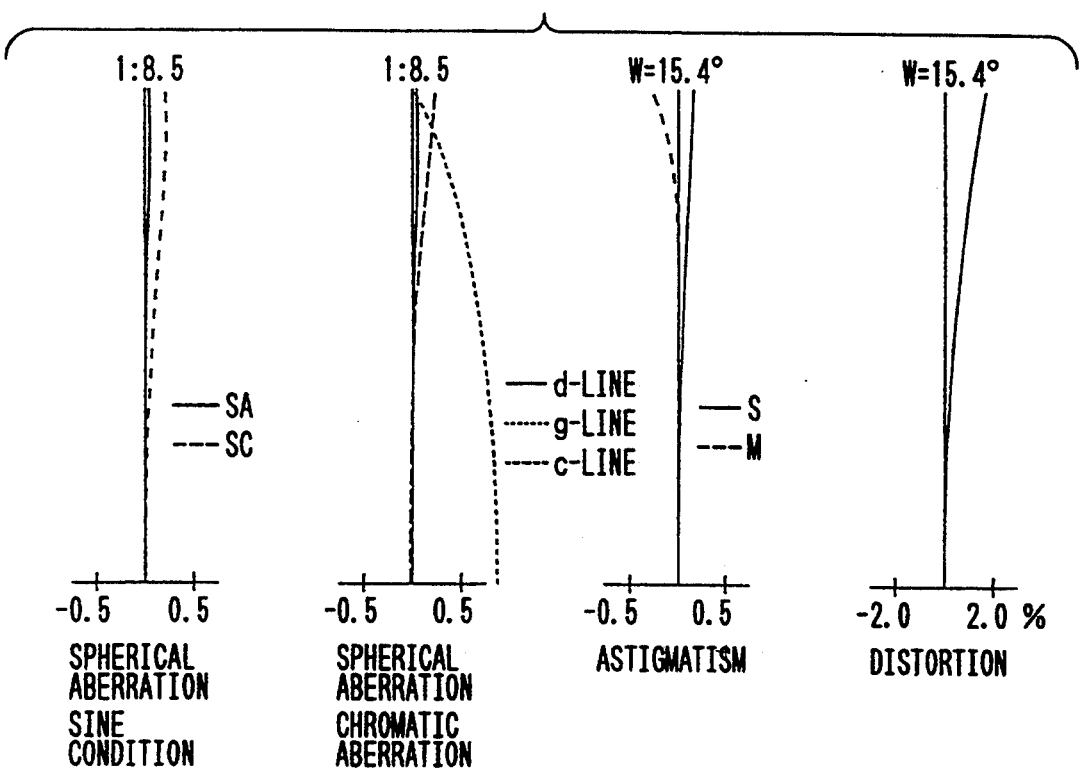

FIG. 5 is a simplified cross-sectional view of the zoom lens system according to Example 3 at the wide-angle end. Specific data for this example are as shown in Table 5. The aberration curves obtained with this lens system are plotted in FIGS. 6(a), 6(b) and 6(c).

TABLE 5

FNO. = 1:3.6, f = 29.00, ω = 36.9, fB = 8.30

| Surface No. | r | d | n | ν |
|---|---|---|---|---|
| 1 | −44.091 | 1.50 | 1.83400 | 37.2 |
| 2 | −158.262 | 2.11 | | |
| 3 | 172.771 | 4.12 | 1.69680 | 55.5 |
| 4 | −36.480 | variable | | |
| 5* | −20.537 | 5.26 | 1.78590 | 44.2 |
| 6 | −928.676 | 2.33 | | |
| 7 | 17.816 | 2.30 | 1.80518 | 25.4 |
| 8 | 13.815 | 7.00 | 1.58913 | 61.2 |
| 9* | −15.870 | variable | | |
| 10* | −252.722 | 2.95 | 1.68893 | 31.1 |
| 11 | −24.052 | 3.18 | | |
| 12 | −11.747 | 1.40 | 1.77250 | 49.6 |
| 13 | 329.855 | | | |

TABLE 5-continued

| Fifth surface: aspheric | Ninth surface: aspheric |
|---|---|
| K = 0 | K = 0 |
| $A_4 = -0.40328626 \times 10^{-4}$ | $A_4 = 0.76751422 \times 10^{-4}$ |
| $A_6 = -0.30242012 \times 10^{-6}$ | $A_6 = 0.92777629 \times 10^{-7}$ |
| $A_8 = 0.14154205 \times 10^{-8}$ | $A_8 = 0.14241736 \times 10^{-8}$ |

| Tenth surface: aspheric |
|---|
| K = 0 |
| $A_4 = 0.44758114 \times 10^{-4}$ |
| $A_6 = 0.22807597 \times 10^{-6}$ |
| $A_8 = 0.64325486 \times 10^{-9}$ |

The values of Fnc., f, f3, ν, d4 and d9 vary with zooming as shown in Table 6 below.

TABLE 6

| FNo. | 3.6 | 5.9 | 8.5 |
|---|---|---|---|
| f | 29.00 | 50.01 | 77.32 |
| fB | 8.30 | 27.13 | 50.91 |
| ω | 36.9 | 22.9 | 15.4 |
| d4 | 3.30 | 7.14 | 10.00 |
| d9 | 11.13 | 5.34 | 2.35 |

EXAMPLE 4

Figure 7:
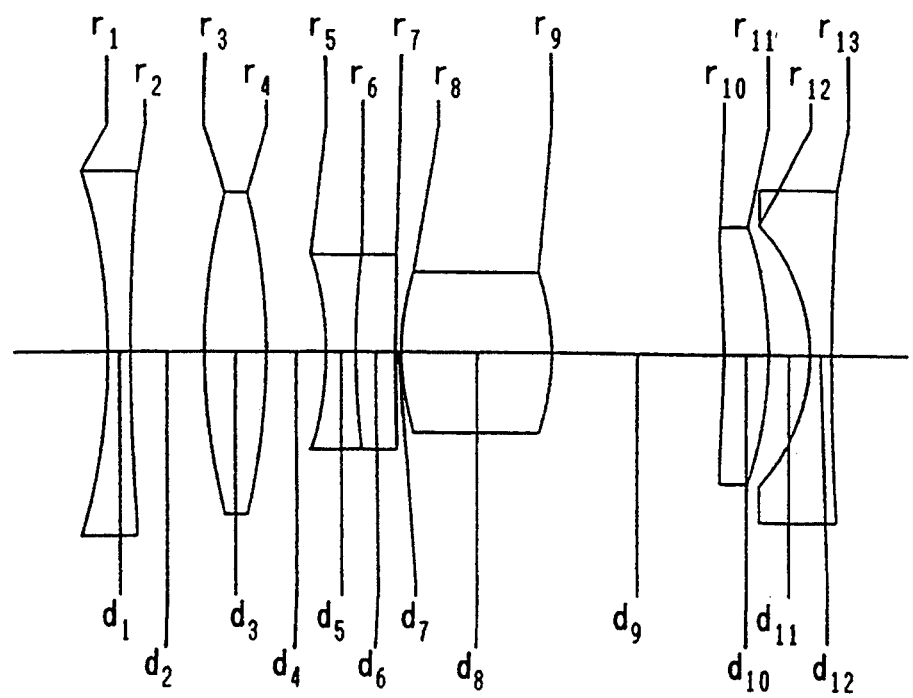
FIG. 7 is a simplified cross-sectional view of the zoom lens system according to Example 4 at the wide-angle end.
Figure 8A:
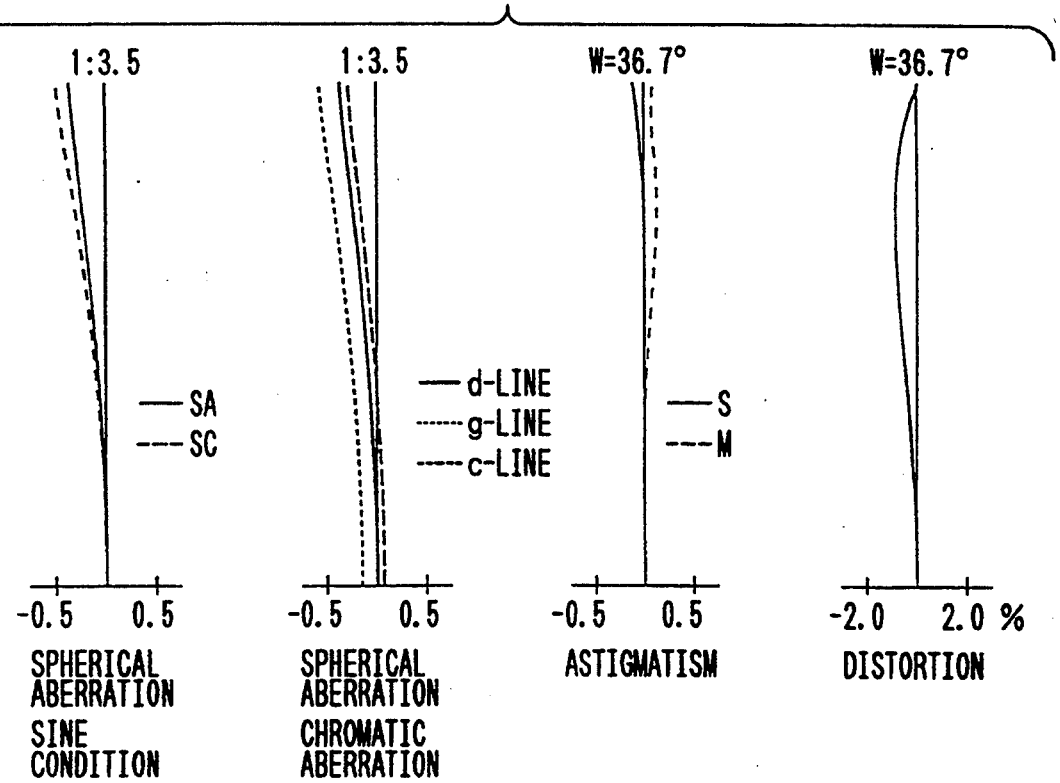
FIG. 8 is a set of graphs plotting the aberration curves obtained with the zoom lens system of Example 4.
Figure 8B:
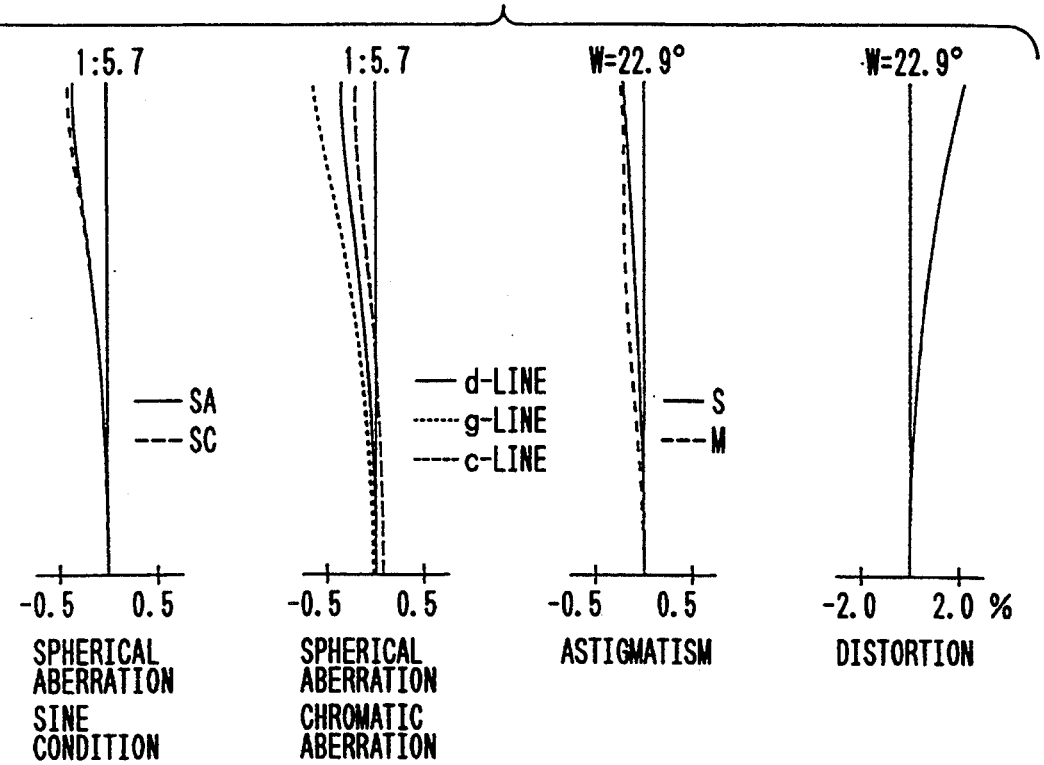
Figure 8C:
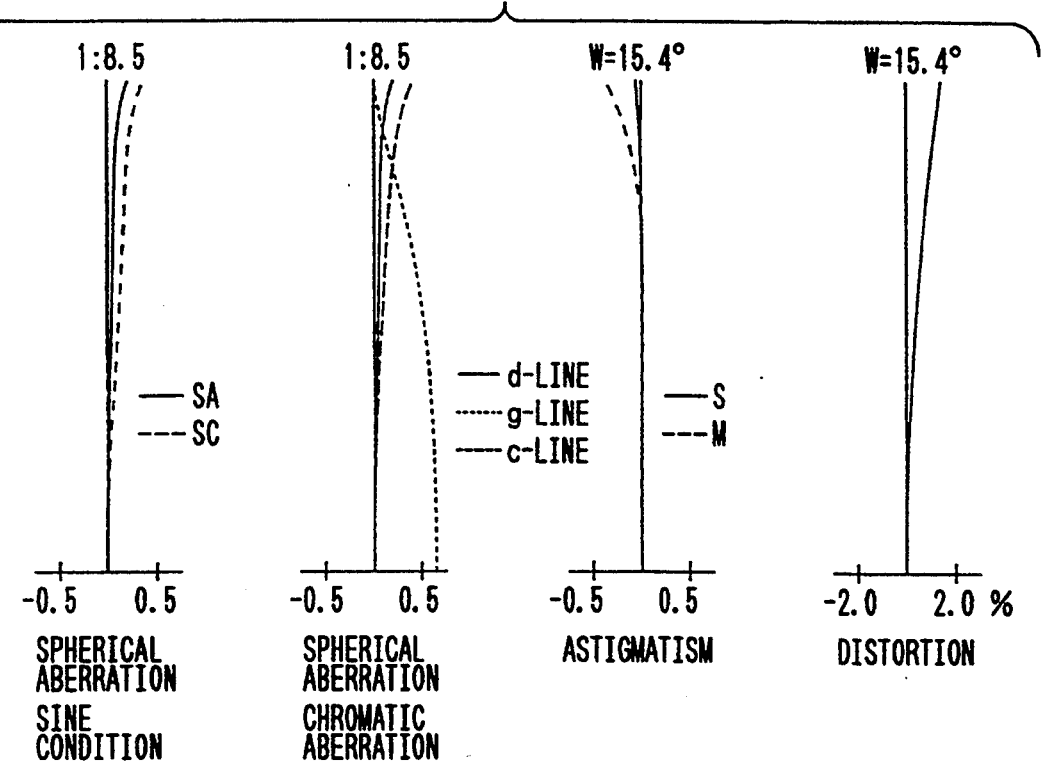

FIG. 7 is a simplified cross-sectional view of the zoom lens system according to Example 4 at the wide-angle end. Specific data for this example are as shown in Table 7. The aberration curves obtained with this lens system are plotted in FIGS. 8(a), 8(b) and 8(c).

TABLE 7

FNO. = 1:3.6, f = 29.00, ω = 36.7, fB = 8.30

| Surface No. | r | d | n | ν |
|---|---|---|---|---|
| 1 | −48.781 | 1.50 | 1.80400 | 46.6 |
| 2 | 150.487 | 5.00 | | |
| 3 | 41.744 | 4.12 | 1.69680 | 55.5 |
| 4 | −42.680 | variable | | |
| 5* | −21.729 | 2.00 | 1.72298 | 33.0 |
| 6 | 48.552 | 2.70 | 1.80518 | 25.4 |
| 7 | 270.592 | 0.35 | | |
| 8 | 17.157 | 10.00 | 1.51728 | 69.6 |
| 9* | −14.701 | variable | | |
| 10* | −60.442 | 2.93 | 1.68893 | 31.1 |
| 11 | −25.695 | 2.70 | | |
| 12 | −12.357 | 1.40 | 1.77250 | 49.6 |
| 13 | 173.629 | | | |

| Fifth surface: aspheric | Ninth surface: aspheric |
|---|---|
| K = 0 | K = 0 |
| $A_4 = -0.40328626 \times 10^{-4}$ | $A_4 = 0.76751422 \times 10^{-4}$ |
| $A_6 = -0.30242012 \times 10^{-6}$ | $A_6 = 0.92777629 \times 10^{-7}$ |
| $A_8 = 0.14154205 \times 10^{-8}$ | $A_8 = 0.14241736 \times 10^{-8}$ |

| Tenth surface: aspheric |
|---|
| K = 0 |
| $A_4 = 0.44758114 \times 10^{-4}$ |
| $A_6 = 0.22307597 \times 10^{-6}$ |
| $A_8 = 0.64325486 \times 10^{-9}$ |

The values of Fno., fB, ω, d4 and d9 vary with zooming as shown in Table 8 below.

TABLE 8

| FNo. | 3.6 | 5.8 | 8.5 |
|---|---|---|---|
| f | 29.00 | 50.02 | 77.32 |
| fB | 8.30 | 26.99 | 50.60 |
| ω | 36.7 | 22.9 | 15.4 |
| d4 | 3.79 | 7.94 | 10.81 |

TABLE 8-continued

| | | | |
|---|---|---|---|
| d9 | 11.33 | 5.42 | 2.33 |

EXAMPLE 5

Figure 9:
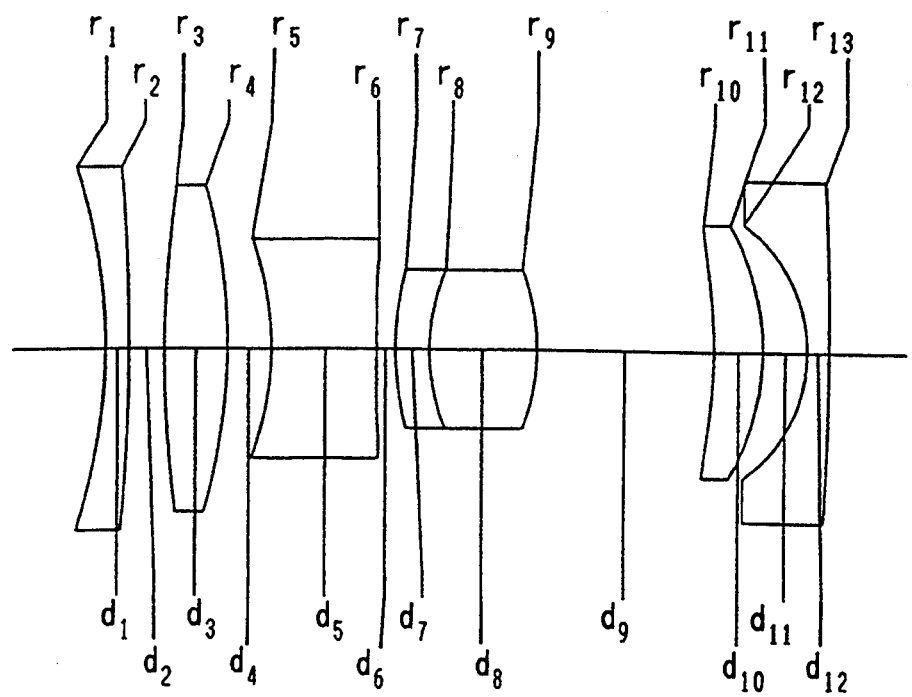
FIG. 9 is a simplified cross-sectional view of the zoom lens system according to Example 5 at the wide-angle end.
Figure 10A:
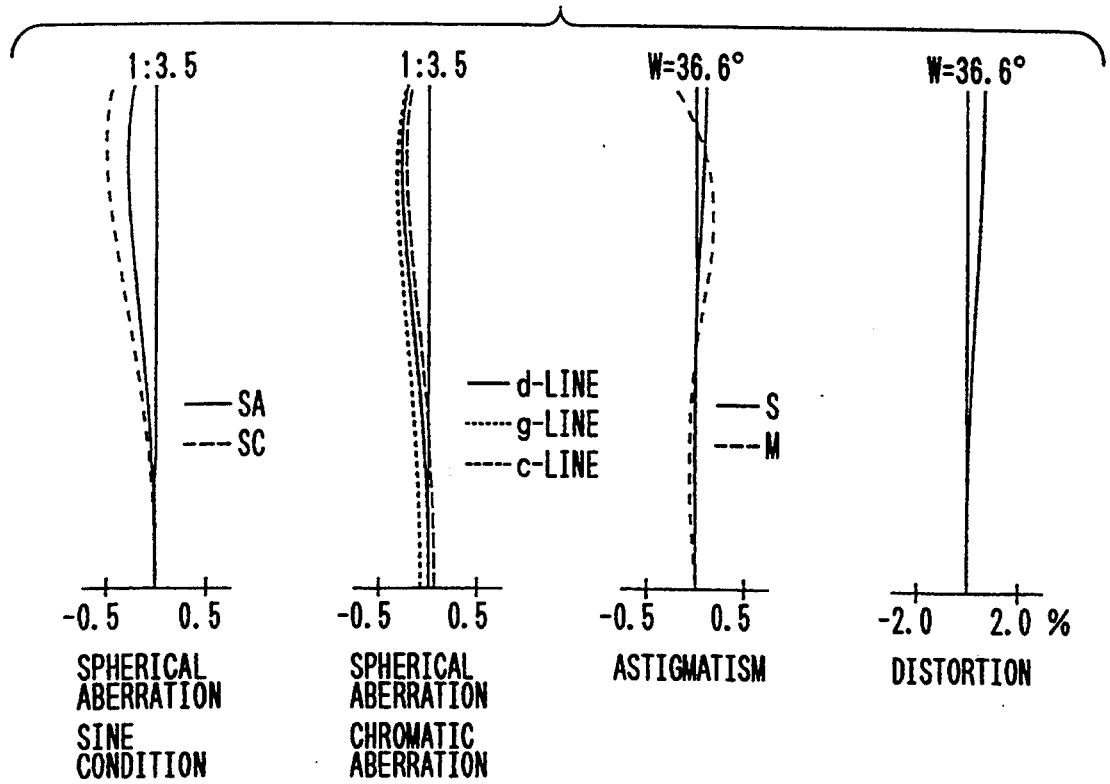
FIG. 10 is a set of graphs plotting the aberration curves obtained with the zoom lens system of Example 5.
Figure 10B:
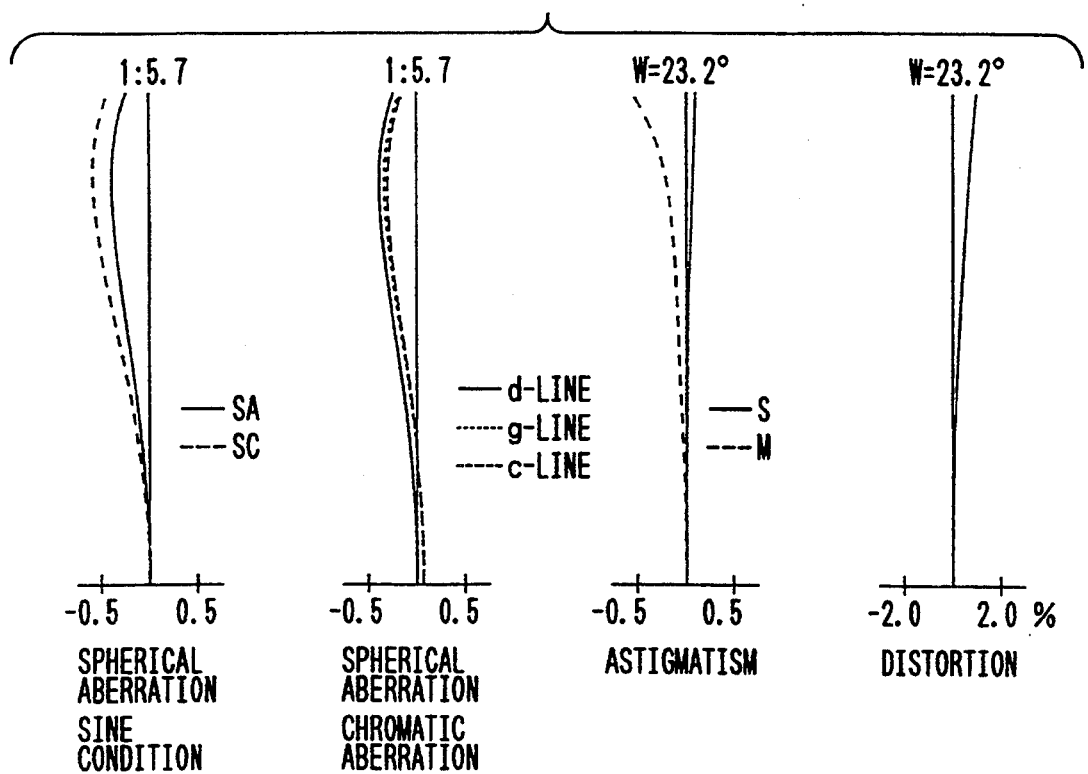
Figure 10C:
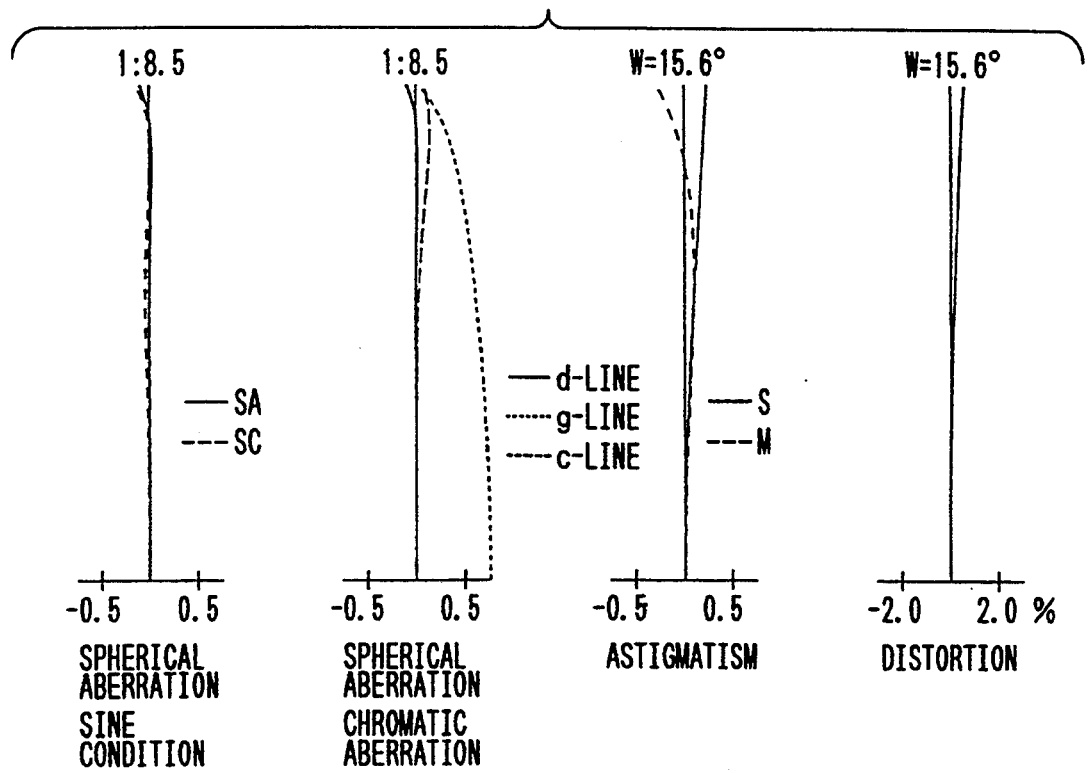

FIG. 9 is a simplified cross-sectional view of the zoom lens system according to Example 5 at the wide-angle end. Specific data for this example are as shown in Table 9. The aberration curves obtained with this lens system are plotted in FIGS. 10(a), 10(b) and 10(c).

TABLE 9

FNO. = 1:3.6, f = 29.00, ω = 36.6, fB = 8.30

| Surface No. | r | d | n | ν |
|---|---|---|---|---|
| 1 | −38.147 | 1.50 | 1.80400 | 46.6 |
| 2 | −130.204 | 2.33 | | |
| 3 | 79.694 | 4.12 | 1.65160 | 58.5 |
| 4 | −38.742 | variable | | |
| 5* | −18.567 | 7.00 | 1.71300 | 53.8 |
| 6* | −339.540 | 1.16 | | |
| 7 | 19.209 | 2.30 | 1.80518 | 25.4 |
| 8 | 12.728 | 7.25 | 1.58913 | 61.2 |
| 9 | −14.803 | variable | | |
| 10* | −31.616 | 3.20 | 1.68893 | 31.1 |
| 11 | −16.654 | 2.97 | | |
| 12 | −10.224 | 1.40 | 1.77250 | 49.6 |
| 13 | −334.112 | | | |

| Fifth surface: aspheric | Sixth surface: aspheric |
|---|---|
| K = 0 | K = 0 |
| $A_4 = 0.53933790 \times 10^{-4}$ | $A_4 = 0.11851729 \times 10^{-3}$ |
| $A_6 = 0.43256456 \times 10^{-7}$ | $A_6 = 0.57572280 \times 10^{-6}$ |
| $A_8 = -0.80134834 \times 10^{-9}$ | $A_8 = 0.73147250 \times 10^{-8}$ |

| Tenth surface: aspheric |
|---|
| K = 0 |
| $A_4 = 0.44863517 \times 10^{-4}$ |
| $A_6 = 0.97674423 \times 10^{-8}$ |
| $A_8 = -0.49338025 \times 10^{-8}$ |

The values of Fno., f, fB, ω, d4 and d9 vary with zooming as shown in Table 10 below.

TABLE 10

| FNo. | 3.6 | 5.9 | 8.5 |
|---|---|---|---|
| f | 29.00 | 50.01 | 77.32 |
| fB | 8.30 | 27.40 | 51.58 |
| ω | 36.6 | 23.2 | 15.6 |
| d4 | 3.90 | 6.75 | 9.47 |
| d9 | 11.67 | 5.78 | 2.73 |

EXAMPLE 6

Figure 11:
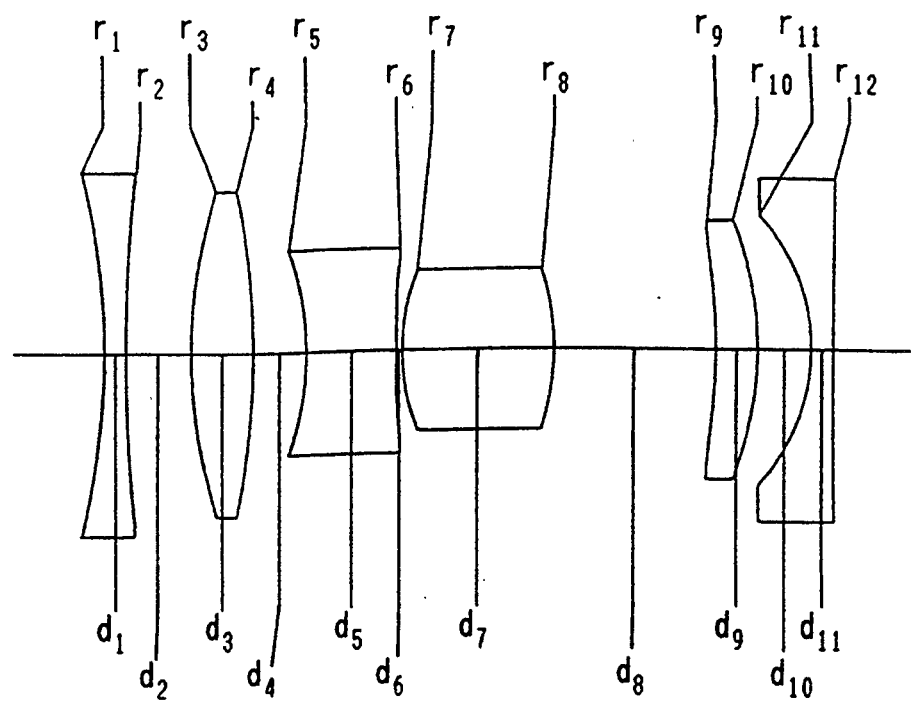
FIG. 11 is a simplified cross-sectional view of the zoom lens system according to Example 6 at the wide-angle end.
Figure 12A:
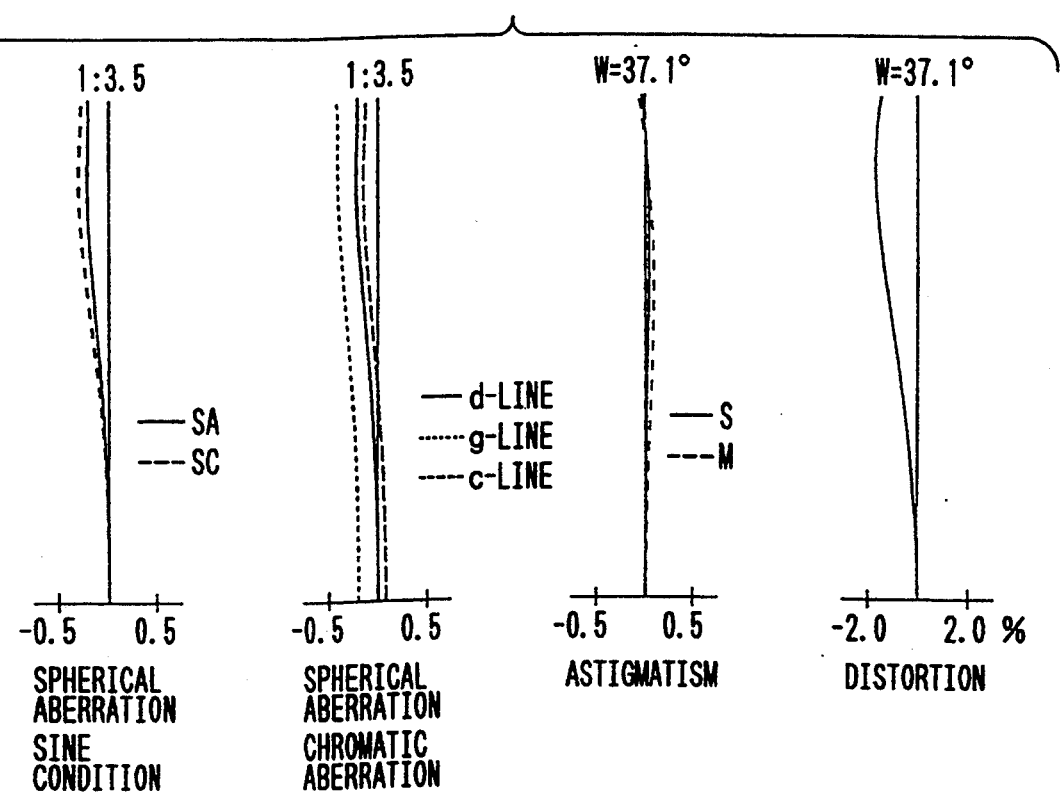
FIG. 12 is a set of graphs plotting the aberration curves obtained with the zoom lens system of Example 6.
Figure 12B:
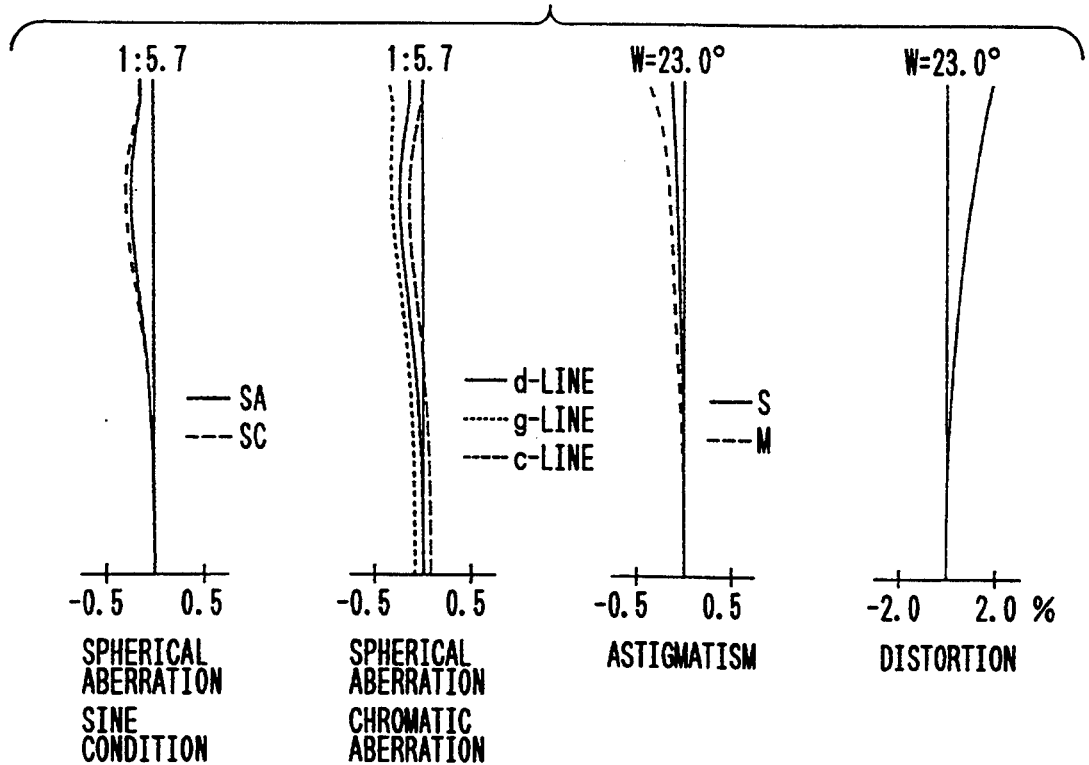
Figure 12C:
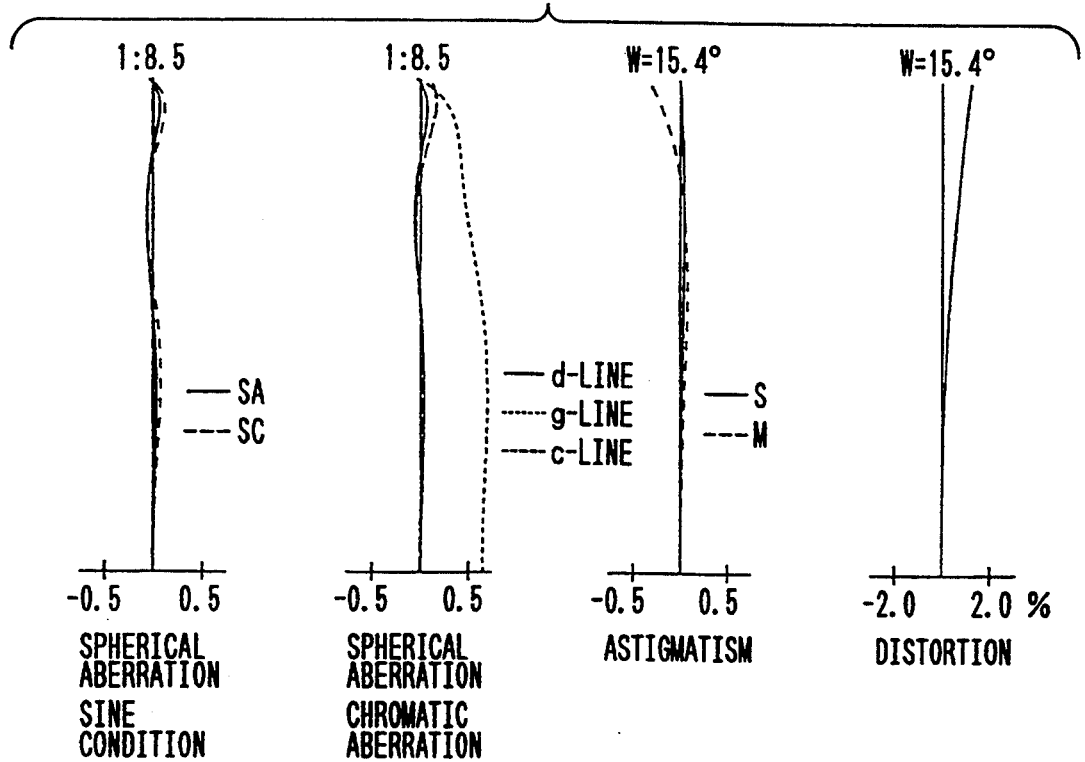

FIG. 11 is a simplified cross-sectional view of the zoom lens system according to Example 6 at the wide-angle end. Specific data for this example are as shown in Table 11. The aberration curves obtained with this lens system are plotted in FIGS. 12(a), 12(b) and 12(c).

TABLE 11

FNO. = 1:3.6, f = 29.00, ω = 37.1, fB = 8.30

| Surface No. | r | d | n | ν |
|---|---|---|---|---|
| 1 | −47.137 | 1.50 | 1.80400 | 46.6 |
| 2 | 102.949 | 4.27 | | |
| 3 | 34.599 | 4.10 | 1.69680 | 55.5 |
| 4 | −50.062 | variable | | |
| 5* | −18.894 | 6.00 | 1.73077 | 40.5 |
| 6* | 589.080 | 0.40 | | |
| 7* | 14.793 | 10.15 | 1.51278 | 69.6 |
| 8* | −14.849 | variable | | |
| 9* | −35.539 | variable | | |
| 10 | −22.691 | 3.52 | | |
| 11 | −12.643 | 1.40 | 1.77250 | 49.6 |
| 12 | 584.859 | | | |

| Fifth surface: aspheric | Sixth surface: aspheric |
|---|---|
| K = 0 | K = 0 |
| $A_4 = 0.44264905 \times 10^{-4}$ | $A_4 = 0.21044890 \times 10^{-3}$ |
| $A_6 = -0.29857214 \times 10^{-6}$ | $A_8 = -0.92688416 \times 10^{-6}$ |
| $A_8 = -0.10413189 \times 10^{-8}$ | $A_8 = 0.17837263 \times 10^{-7}$ |

| Seventh surface: aspheric | Eighth surface: aspheric |
|---|---|
| K = 0 | K = 0 |
| $A_4 = 0.183945889 \times 10^{-3}$ | $A_4 = 0.10352965 \times 10^{-3}$ |
| $A_6 = -0.17263808 \times 10^{-5}$ | $A_8 = 0.28528680 \times 10^{-6}$ |
| $A_8 = 0.32134510 \times 10^{-7}$ | $A_8 = 0.30704568 \times 10^{-7}$ |

| Ninth surface: aspheric |
|---|
| K = 0 |
| $A_4 = 0.43905689 \times 10^{-4}$ |
| $A_6 = 0.27532515 \times 10^{-6}$ |
| $A_8 = 0.12788380 \times 10^{-8}$ |

The values of Fno., f, fB, ω, d4 and d8 vary with zooming as shown in Table 12 below.

TABLE 12

| FNo. | 3.6 | 5.8 | 8.5 |
|---|---|---|---|
| f | 29.00 | 50.01 | 77.48 |
| fB | 8.30 | 26.35 | 49.52 |
| ω | 37.1 | 23.0 | 15.4 |
| d4 | 3.46 | 8.06 | 10.84 |
| d8 | 10.71 | 5.21 | 2.34 |

EXAMPLE 7

Figure 13:
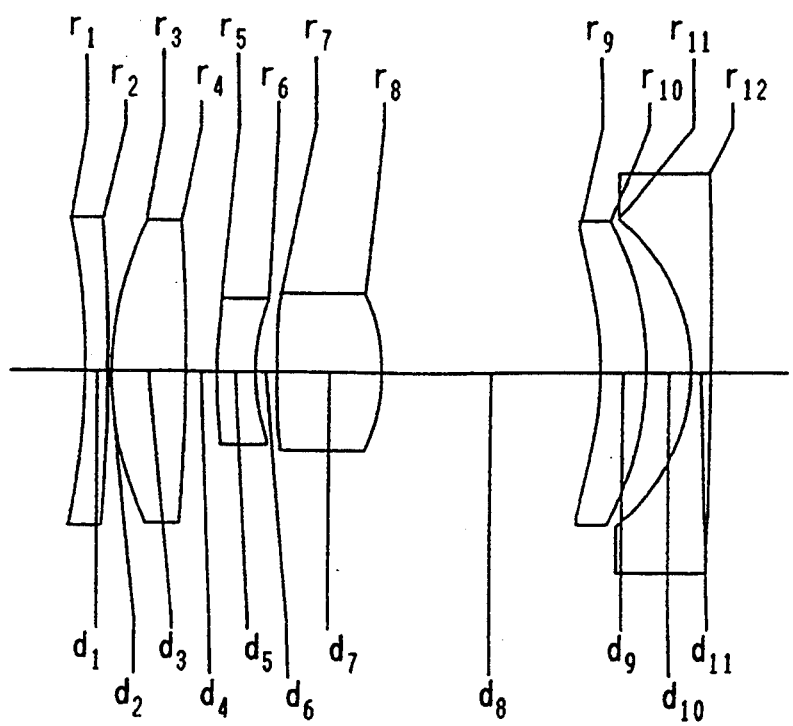
FIG. 13 is a simplified cross-sectional view of the zoom lens system according to Example 7 at the wide-angle end.
Figure 14A:
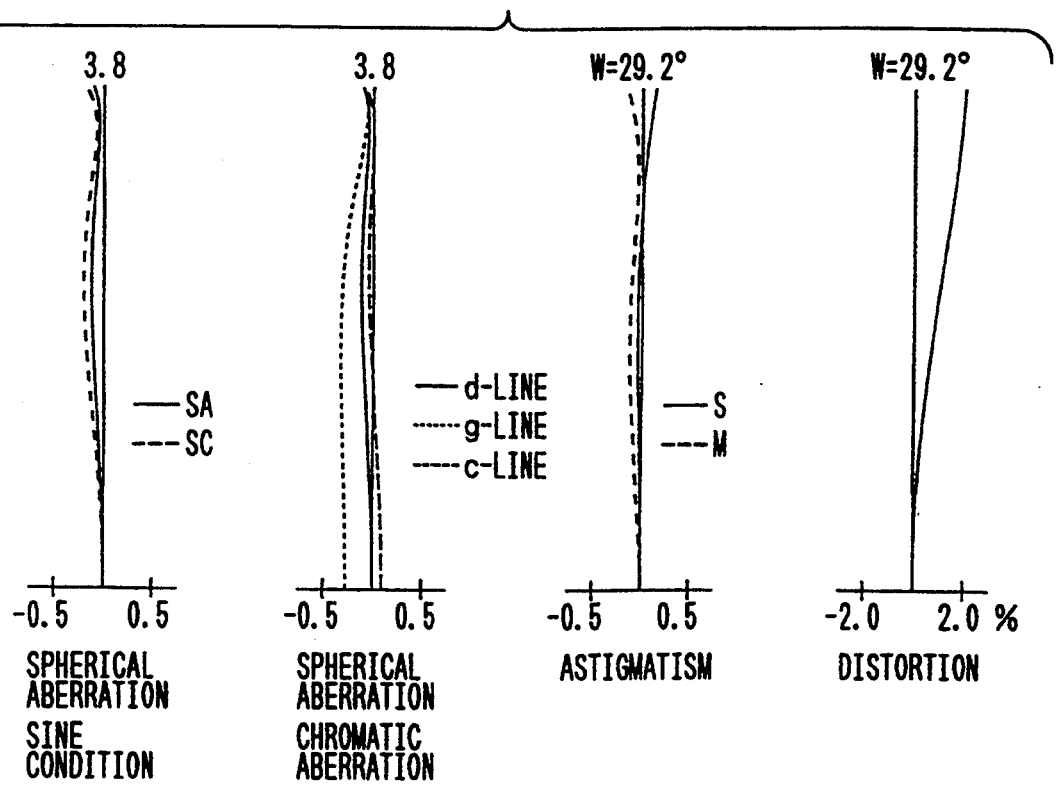
FIG. 14 is a set of graphs plotting the aberration curves obtained with the zoom lens system of Example 7.
Figure 14B:
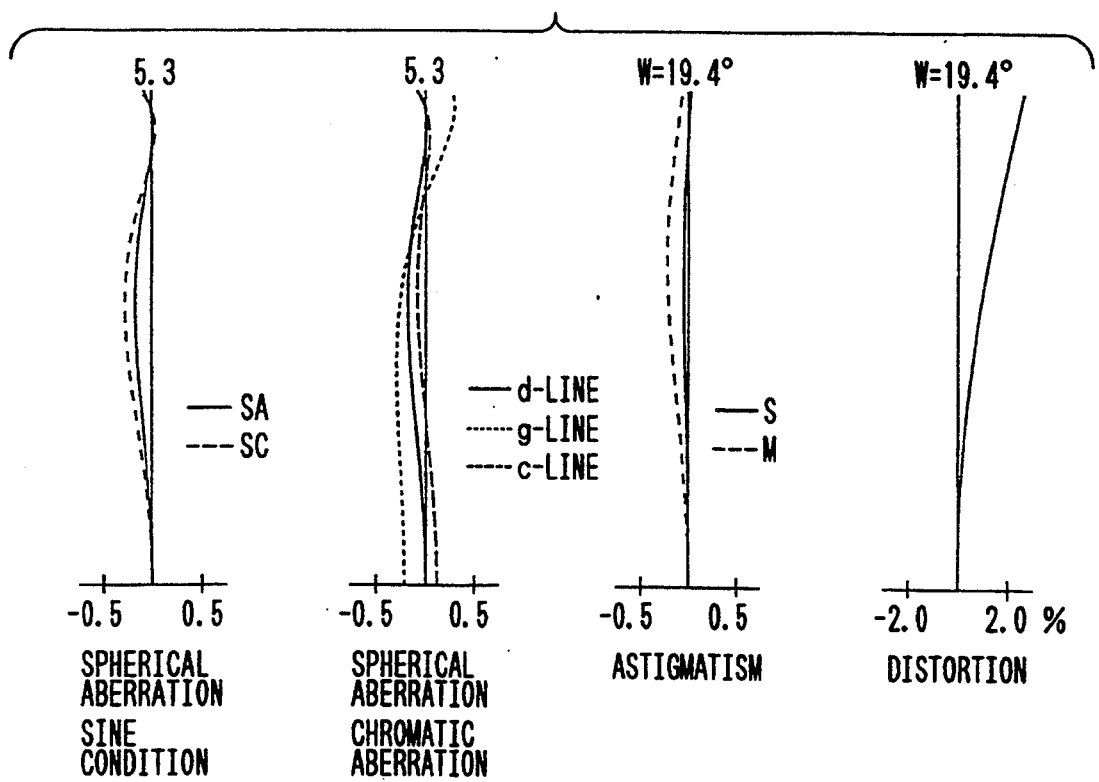
Figure 14C:
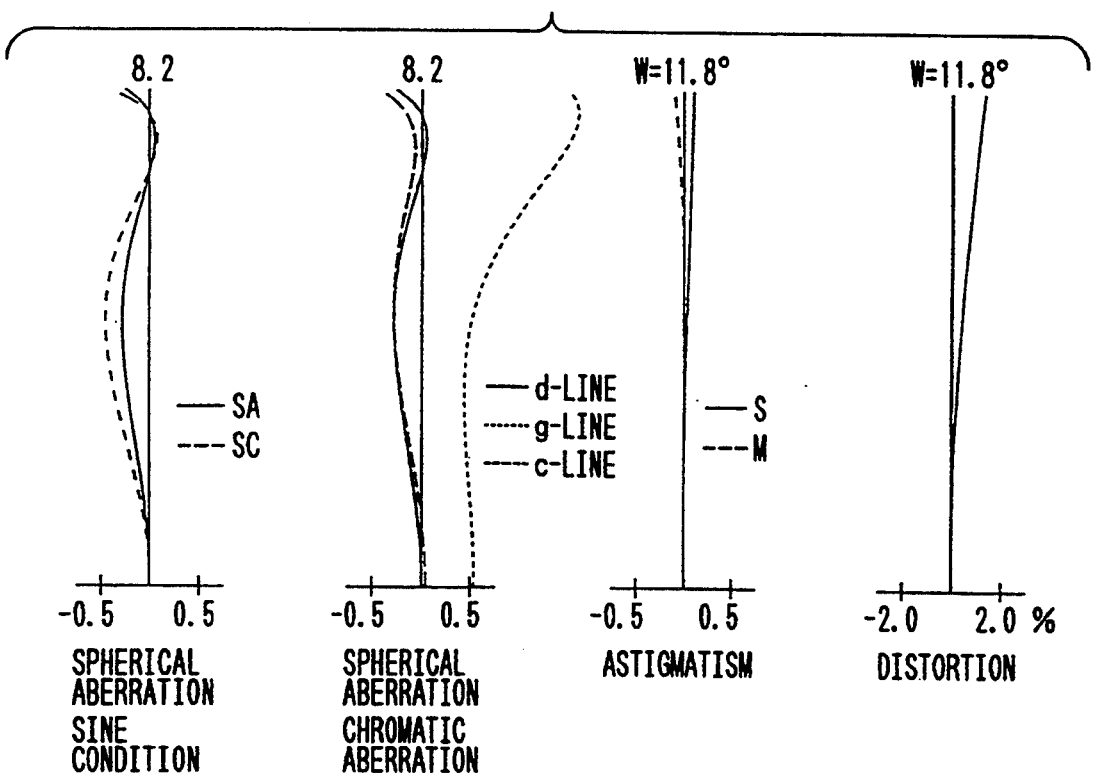

FIG. 13 is a simplified cross-sectional view of the zoom lens system according to Example 7 at the wide-angle end. Specific data for this example are as shown in Table 13. The aberration curves obtained with this lens system are plotted in FIGS. 14(a), 14(b) and 14(c).

TABLE 13

FNO. = 1:3.8, f = 37.99, ω = 29.2, fB = 8.50

| Surface No. | r | d | n | ν |
|---|---|---|---|---|
| 1 | −46.849 | 1.50 | 1.83400 | 37.2 |
| 2 | −120.146 | 0.02 | | |
| 3 | 22.585 | 4.62 | 1.48749 | 70.2 |
| 4 | −126.251 | variable | | |
| 5* | −27.245 | 2.5 | 1.83400 | 37.2 |
| 6 | 12.806 | 1.41 | | |
| 7* | 213.136 | 6.88 | 1.62299 | 58.1 |
| 8 | −12.198 | variable | | |
| 9* | −22.397 | 3.03 | 1.48749 | 70.2 |
| 10 | −21.089 | variable | | |
| 11 | −12.899 | 1.25 | 1.56907 | 71.3 |
| 12 | −468.504 | | | |

| Fifth surface: aspheric | Seventh surface: aspheric |
|---|---|
| K = 0 | K = 0 |
| $A_4 = 0.20748329 \times 10^{-4}$ | $A_4 = 0.22180924 \times 10^{-4}$ |
| $A_6 = 0.26813269 \times 10^{-6}$ | $A_6 = 0.31810508 \times 10^{-7}$ |
| $A_8 = 0$ | $A_8 = 0$ |

| Ninth surface: aspheric |
|---|
| K = 0 |
| $A_4 = 0.58355359 \times 10^{-4}$ |
| $A_6 = 0.10192653 \times 10^{-6}$ |
| $A_8 = 0.58310163 \times 10^{-9}$ |

The values of Fno., f, fB, ω, d4 and d8 vary with zooming as shown in Table 14.

TABLE 14

| FNo. | 3.8 | 5.4 | 8.2 |
|---|---|---|---|
| f | 37.99 | 60.00 | 102.00 |
| fB | 8.50 | 24.29 | 53.68 |
| ω | 29.2 | 19.4 | 11.8 |

TABLE 14-continued

| | | | |
|---|---|---|---|
| d4 | 2.00 | 8.36 | 13.60 |
| d8 | 14.60 | 8.24 | 3.00 |

EXAMPLE 8

Figure 15:
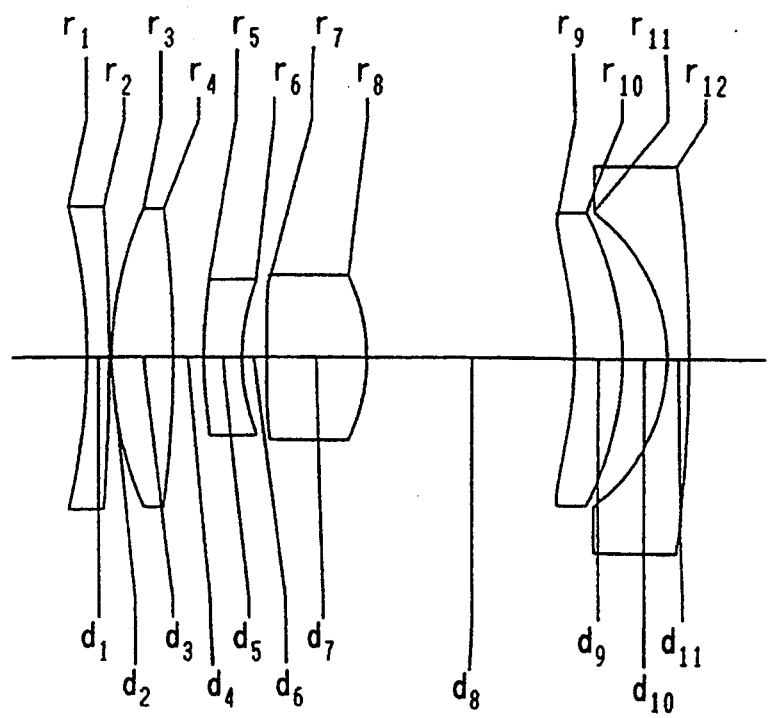
FIG. 15 is simplified cross-sectional view of the zoom lens system according to Example 8 at the wide-angle end.
Figure 16A:
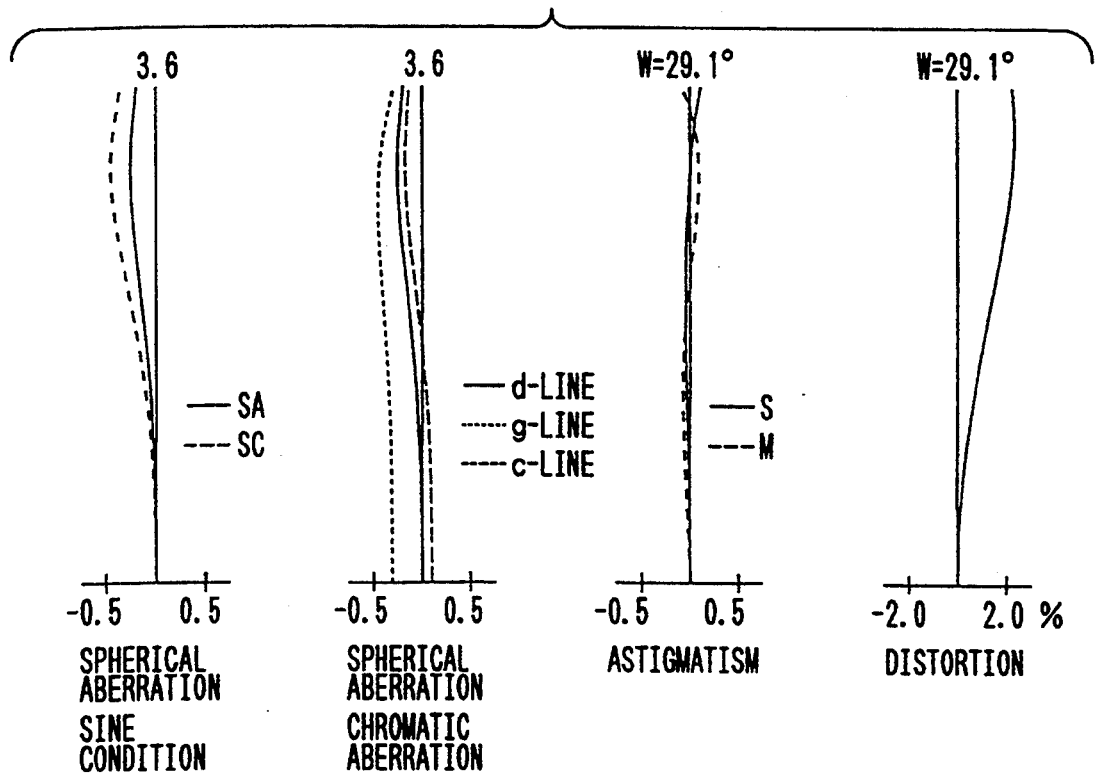
FIG. 16 is a set of graphs plotting the aberration curves obtained with the zoom lens system of Example 8.
Figure 16B:
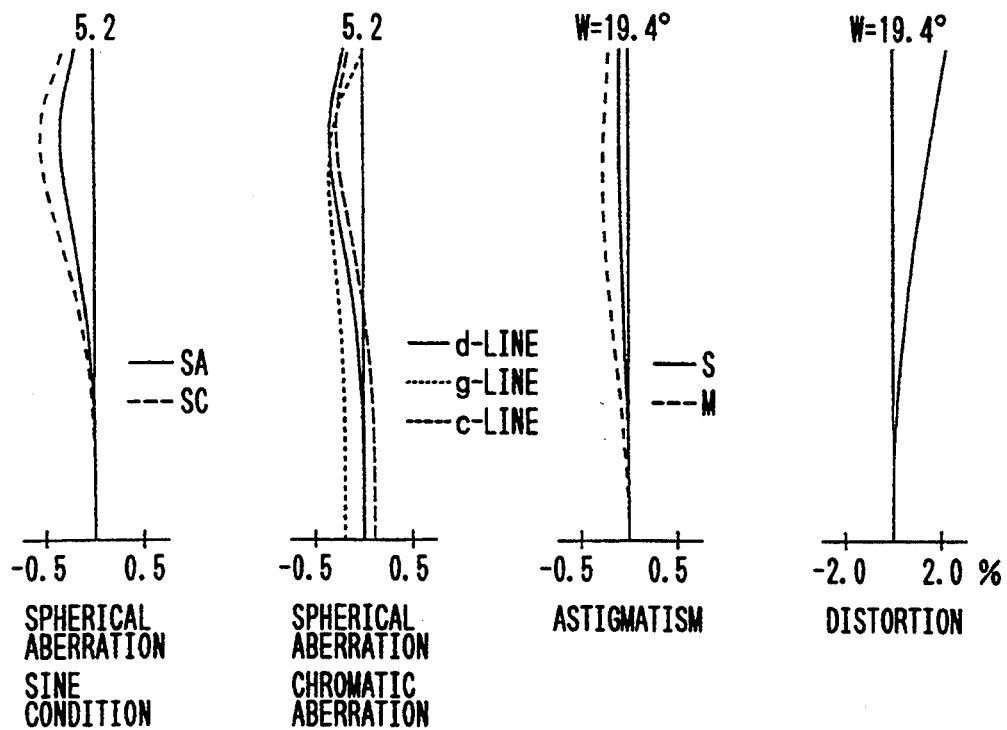
Figure 16C:
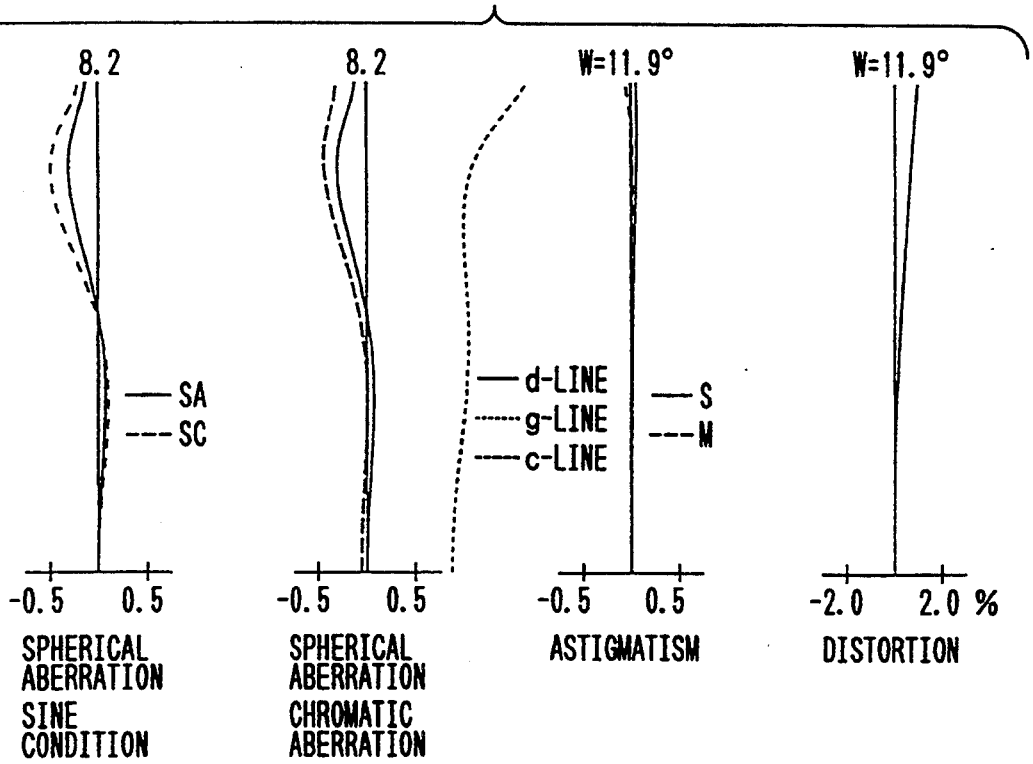

FIG. 15 is a simplified cross-sectional view of the zoom lens system according to Example 8 at the wide-angle end. Specific data for this example are as shown in Table 15. The aberration curves obtained with this lens system are plotted in FIGS. 16(a), 16(b) and 16(c).

TABLE 15

FNO. = 1:3.6, f = 38.00, ω = 29.1, fB = 8.59

| Surface No. | r | d | n | ν |
|---|---|---|---|---|
| 1 | −40.624 | 1.50 | 2.83400 | 37.2 |
| 2 | −131.101 | 0.20 | | |
| 3 | 24.074 | 4.12 | 1.48749 | 70.2 |
| 4 | −74.799 | variable | | |
| 5* | 24.844 | 2.50 | 1.73077 | 40.5 |
| 6 | 13.447 | 1.64 | | |
| 7* | 661.131 | 6.68 | 1.58913 | 61.2 |
| 8 | −12.420 | variable | | |
| 9* | −23.000 | 3.16 | 1.49176 | 57.4 |
| 10 | −20.448 | 3.03 | | |
| 11 | −12.060 | 1.40 | 1.64000 | 60.1 |
| 12 | −101.186 | | | |

| Fifth surface: aspheric | Seventh surface: aspheric |
|---|---|
| K = 0 | K = 0 |
| $A_4 = -0.17966510 \times 10^{-3}$ | $A_4 = 0.15361650 \times 10^{-3}$ |
| $A_6 = -0.19844449 \times 10^{-5}$ | $A_6 = 0.26760264 \times 10^{-5}$ |
| $A_8 = -0.12125023 \times 10^{-7}$ | $A_8 = 0$ |

| Ninth surface: aspheric |
|---|
| K = 0 |
| $A_4 = 0.78007555 \times 10^{-4}$ |
| $A_6 = 0.17348425 \times 10^{-6}$ |
| $A_8 = 0.15729598 \times 10^{-8}$ |

The values of Fno., f, fB, ω, d4 and d8 vary with zooming as shown in Table 16 below.

TABLE 16

| FNo. | 3.6 | 5.2 | 8.2 |
|---|---|---|---|
| f | 38.00 | 60.00 | 102.00 |
| fB | 8.50 | 24.58 | 54.67 |
| ω | 29.1 | 19.4 | 11.9 |
| d4 | 2.00 | 7.78 | 12.39 |
| d8 | 23.89 | 8.11 | 3.50 |

EXAMPLE 5

Figure 17:
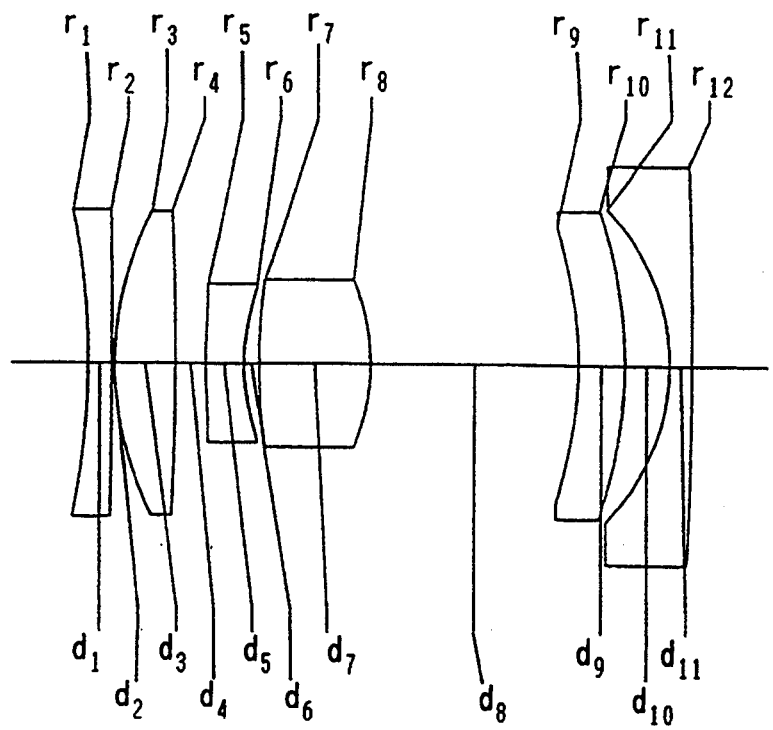
FIG. 17 is a simplified cross-sectional view of the zoom lens system according to Example 9 at the wide-angle end.
Figure 18A:
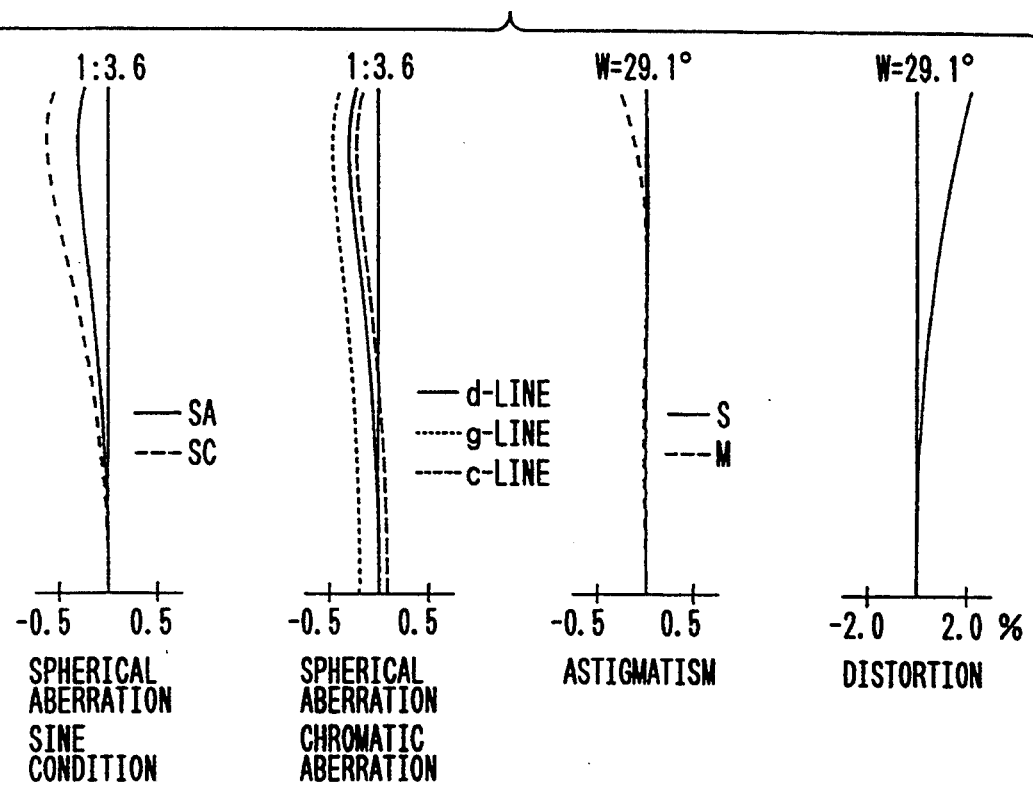
FIG. 18 is a set of graphs plotting the aberration curves obtained with the zoom lens system of Example 9.
Figure 18B:
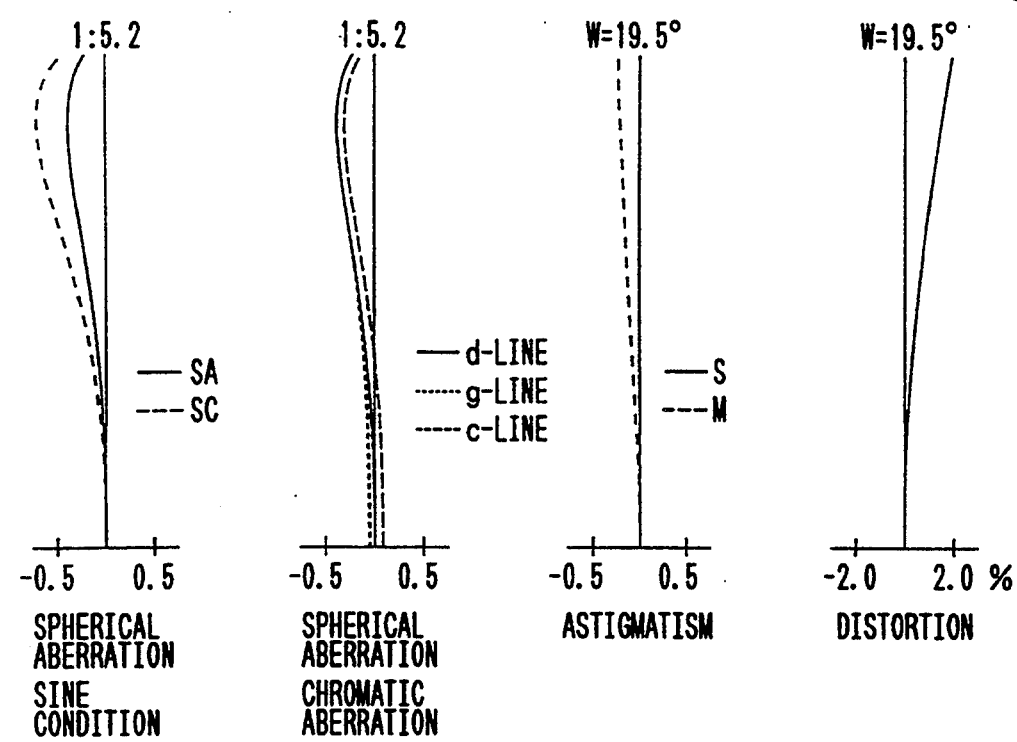
Figure 18C:
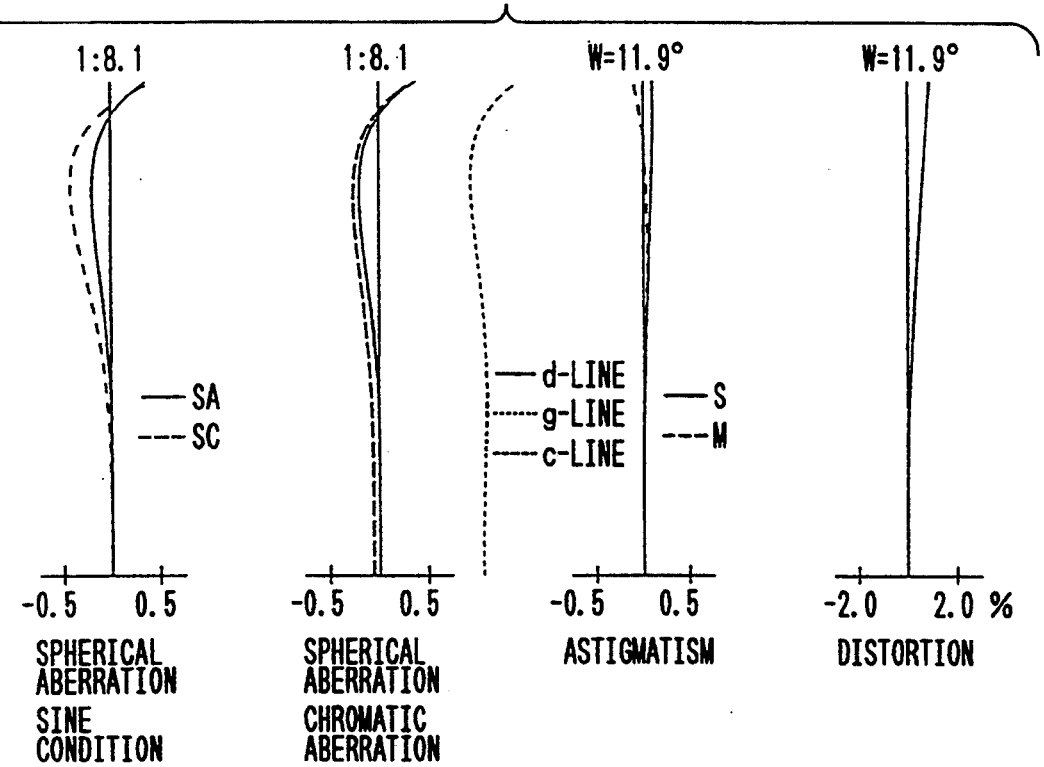

FIG. 17 is a simplified cross-sectional view of the zoom lens system according to Example 9 at the wide-angle end. Specific data for this example are as shown in Table 17. The aberration curves obtained with this lens system are plotted in FIGS. 18(a), 18(b) and 18(c).

TABLE 17

FNO. = 1:3.6, f = 38.00, ω = 29.1, fB = 8.50

| Surface No. | r | d | n | ν |
|---|---|---|---|---|
| 1 | −47.431 | 1.50 | 1.83400 | 37.2 |
| 2 | −656.486 | 0.20 | | |
| 3 | 22.259 | 3.92 | 1.58913 | 61.2 |
| 4 | −193.075 | variable | | |
| 5* | 31.683 | 2.50 | 1.73077 | 40.5 |
| 6* | 12.063 | 1.00 | | |
| 7 | 36.333 | 7.50 | 1.58913 | 61.2 |
| 8 | −13.056 | variable | | |
| 9* | −23.000 | 2.97 | 1.48749 | 70.2 |
| 10 | −30.680 | 2.94 | | |
| 11 | −14.596 | 1.40 | 1.56907 | 71.3 |

TABLE 17-continued

| 12 | −329.137 | | | |
|---|---|---|---|---|

| Fifth surface: aspheric | Sixth surface: aspheric |
|---|---|
| K = 0 | K = 0 |
| $A_4 = -0.42114860 \times 10^{-3}$ | $A_4 = -0.45457599 \times 10^{-3}$ |
| $A_6 = 0.90193505 \times 10^{-6}$ | $A_6 = 0.22145289 \times 10^{-5}$ |
| $A_8 = 0$ | $A_8 = 0$ |

| Ninth surface: aspheric |
|---|
| K = 0 |
| $A_4 = 0.38145979 \times 10^{-4}$ |
| $A_6 = -0.20084770 \times 10^{-7}$ |
| $A_8 = 0.27896596 \times 10^{-8}$ |

The values of Fno., f, fB, ω, d4 and d8 vary with zooming as shown in Table 18 below.

TABLE 18

| FNo. | 3.6 | 5.2 | 8.1 |
|---|---|---|---|
| f | 38.00 | 60.00 | 102.00 |
| fB | 8.50 | 24.62 | 54.90 |
| ω | 29.1 | 19.5 | 11.9 |
| d4 | 2.00 | 7.81 | 12.47 |
| d8 | 13.97 | 8.16 | 3.50 |

Table 19 shows values that satisfy the conditions (a) to (d) in Examples 1 to 9.

TABLE 19

| Condition | ΔI2 | ΔIII2 | N2a | ν2a |
|---|---|---|---|---|
| Ex. 1 | −21.0 | −0.72 | 1.731 | 40.5 |
| Ex. 2 | −22.1 | −0.55 | 1.804 | 46.6 |
| Ex. 3 | −20.3 | −0.32 | 1.786 | 44.2 |
| Ex. 4 | −22.3 | −0.61 | 1.723 | 33.0 |
| Ex. 5 | −20.0 | −0.38 | 1.713 | 53.8 |
| Ex. 6 | −28.1 | −0.25 | 1.731 | 40.5 |
| Ex. 7 | −20.3 | −2.71 | 1.834 | 37.2 |
| Ex. 8 | −24.0 | −2.59 | 1.731 | 40.5 |
| Ex. 9 | −15.7 | −2.89 | 1.731 | 40.5 |

ADVANTAGES OF THE INVENTION

As described on the foregoing pages, the zoom lens system of the present invention adopts an arrangement as simple as a three-group composition and yet, by introducing special features in the arrangement of lens elements in the second lens group and their shape, it achieves a high zoom ratio of 2.5 and more while featuring a wider view angle and reducing the lens diameter and the overall lens length. At the same time, it experiences less aberrational variations during zooming from the wide-angle to the narrow-angle end or from infinity to near distance. Further, it successfully reduces the number of lens elements used in the overall system. Consequently, the present invention offers a zoom lens system of a telephoto type that consists of a total of six elements in three groups and which is suitable for use with a compact camera

What is claimed is:

1. In a zoom lens system comprising at least three lens groups which are arranged, in order from the object side, as a first lens group having a positive focal length, a second lens group having a positive focal length and a third lens group having a negative focal length, wherein, when zooming is carried out from the wide-angle to the narrow-angle end, said first, second and third lens groups are all moved towards the object so that the distance between said first and second lens groups is increased whereas the distance between said second and third lens groups is decreased, the improvement wherein said second lens group has at least two aspheric surfaces; and wherein said at least two aspheric surfaces satisfy the following conditions (a) and (b):

(a) $-40 < \Delta I2 \leq -15.7$
(b) $-4 < \Delta III2 < 0$ where $\Delta I2$ is: the sum of variations in the coefficient of the third-order spherical aberration due to all aspheric surfaces in the second lens group (the aberration coefficient is such as is calculated with the focal length of the overall system at the wide-angle end being taken as 1.0); and $\Delta III2$ is: the sum of variations in the coefficient of astigmatism due to all aspheric surfaces in the second lens group.

2. A zoom lens system according to claim 1 wherein said second lens group comprises a sub-group 2a having a negative focal length and a sub-group 2b having a positive focal length 3. A zoom lens system according to claim 2 wherein each of said sub-groups 2a and 2b has at least one aspheric surface.

4. A zoom lens system according to claim 1, wherein said second lens group comprises, in order from the object side, a sub-group 2a having a negative focal length and a sub-group 2b having a positive focal length, said sub-group 2a having an aspheric lens that satisfies the following conditions (c) and (d):

(c) $1.68 < N2a$
(d) $32 < \nu 2a$ where

N2a: the refractive index at the d-line of the aspheric lens in the sub-group 2a; and 2a: the Abbe number at the d-line of the aspheric lens in the sub-group 2a.

5. In a zoom lens system comprising at least three lens groups which are arranged, in order from the object side, as a first lens group having a positive focal length, a second lens group having a positive focal length and a third lens group having a negative focal length, wherein, when zooming is carried out from the wide-angle to the narrow-angle end, said first, second and third lens groups are all moved towards the object so that the distance between said first and second lens groups is increased whereas the distance between said second and third lens groups is decreased, the improvement wherein said second lens group has at least two aspheric surfaces; and wherein said third lens group comprises two lens elements which are arranged, in order from the object side, as a positive and a negative element and has at least one aspheric surface.

6. A zoom lens system according to claim 5, wherein said second lens group comprises a sub-group 2a having a negative focal length and a sub-group 2b having a positive focal length.

7. A zoom lens system according to claim 6, wherein each of said sub-groups 2a and 2b has at least one aspheric surface.

8. A zoom lens system according to claim 5, wherein said at least two aspheric surfaces satisfy the following conditions (a) and (b):

(a) $-40 < \Delta I2 < 0$
(b) $-4 < \Delta III2 < 0$ where $\Delta I2$ is: the sum of variations in the coefficient of the third-order spherical aberration due to all aspheric surfaces in the second lens group (the aberration coefficient is such as is calculated with the focal length of the overall system at the wide-angle end being taken as 1.0); and $\Delta III2$ is: the sum of variations in the coefficient of astigmatism due to all aspheric surfaces in the second lens group.

9. A zoom lens system according to claim 5, wherein said second lens group comprises, in order from the object side, a sub-group 2a having a negative focal length and a sub-group 2b having a positive focal length, said sub-group 2a having an aspheric lens that satisfies the following conditions (c) and (d):

(c) $1.68 < N2a$
(d) $32 < \nu 2a$ where

N2a is: the refractive index at the d-line of the aspheric lens in the sub-group 2a; and 2a is: the Abbe number at the d-line of the aspheric lens in the sub-group 2a.

10. In a zoom lens system comprising at least three lens groups which are arranged, in order from the object side, as a first lens group having a positive focal length, a second lens group having a positive focal length and a third lens group having a negative focal length, wherein, when zooming is carried out from the wide-angle to the narrow-angle end, said first, second and third lens groups are all moved towards the object so that the distance between said first and second lens groups is increased whereas the distance between said second and third lens groups is decreased, the improvement wherein said second lens group has at least two aspheric surfaces; and wherein said third lens group consists of two lens elements which are arranged, in order from the object side, as a negative and a negative element and has at least one aspheric surface.

11. A zoom lens system according to claim 10, wherein said second lens group comprises a sub-group 2a having a negative focal length and a sub-group 2b having a positive focal length.

12. A zoom lens system according to claim 11, wherein each of said sub-groups 2a and 2b has at least one aspheric surface.

13. In a zoom lens system comprising at least three lens groups which are arranged, in order from the object side, as a first lens group having a positive focal length, a second lens group having a positive focal length and a third lens group having a negative focal length, wherein, when zooming is carried out from the wide-angle to the narrow-angle end, said first, second and third lens groups are all moved towards the object so that the distance between said first and second lens groups is increased whereas the distance between said second and third lens groups is decreased, the improvement wherein said first lens group comprises only two lens components which are arranged, in order from the object side, as a negative and a positive component, said second lens group comprising only two lens components which are arranged, in order from the object side, as a negative and a positive component, and said third lens group comprising only two lens components which are arranged, in order from the object side, as a positive and a negative component, making up a total of only six lens components.

14. A zoom lens system according to claim 13 wherein said second lens group comprises, in order from the object side, a sub-group 2a having negative focal length and a sub-group 2b having a positive focal length and has at least two aspheric surfaces.

15. A zoom lens system according to claim 13 wherein said second lens group comprises, in order from the object side, a sub-group 2a having a negative focal length and a sub-group 2b having a positive focal length and has at least two aspheric surfaces.

16. In a zoom lens system comprising at least three lens groups which are arranged, in order from the object side, as a first lens group having a positive focal length, a second lens group having a positive focal length and a third lens group having a negative focal length, wherein, when zooming is carried out from the wide-angle to the narrow-angle end, said first, second and third lens groups are all moved towards the object so that the distance between said first and second lens groups is increased whereas the distance between said second and third lens groups is decreased, the improvement wherein said first lens group comprises only two lens components which are arranged, in order from the object side, as a negative and a positive component, said second lens group comprising only two lens components which are arranged, in order from the object side, as a negative and a positive component, said third lens group comprising only two lens components which are arranged, in order from the object side, as a negative and a negative component, making up a total of only six lens components.

17. In a zoom lens system comprising at least three lens groups which are arranged, in order from the object side, as a first lens group having a positive focal length, a second lens group having a positive focal length and a third lens group having a negative focal length, wherein, when zooming is carried out from the wide-angle to the narrow-angle end, said first, second and third lens groups are all moved towards the object so that the distance between said first and second lens group is increased whereas the distance between said second and third lens groups is decreased, the improvement wherein said second lens group has at least two aspheric surfaces;

wherein said third lens group comprises two lens elements which are arranged, in order from the object side, as a negative and a negative element and has at least one aspheric surface; and wherein said at least two aspheric surfaces satisfy the following conditions (a) and (b):

(a) $-40 < \Delta I2 < 0$
(b) $-4 < \Delta III2 < 0$ where $\Delta I2$ is: the sum of variations in the coefficient of the third-order spherical aberration due to all aspheric surfaces in the second lens group (the aberration coefficient is such as is calculated with the focal length of the overall system at the wide-angle end being taken as 1.0); and $\Delta III2$ is: the sum of variations in the coefficient of astigmatism due to all aspheric surfaces in the second lens group.

18. In a zoom lens system comprising at least three lens groups which are arranged, in order from the object side, as a first lens group having a positive focal length, a second lens group having a positive focal length and a third lens group having a negative focal length, wherein, when zooming is carried out from the wide-angle to the narrow-angle end, said first, second and third lens groups are all moved towards the object so that the distance between said first and second lens groups is increased whereas the distance between said second and third lens groups is decreased, the improvement wherein said second lens group has at least two aspheric surfaces;

wherein said third lens group comprises two lens elements which are arranged, in order from the object side, as a negative and a negative element and has at least one aspheric surface; and wherein said second lens group comprises, in order from the object side, a sub-group 2a having a negative focal length and a sub-group 2b having a positive focal length, said sub-group 2a having an aspheric lens that satisfies the following conditions (c) and (d):

(c) $1.68 < N2a$
(d) $32 < \nu 2a$ where $N2a$ is: the refractive index at the d-line of the aspheric lens in the sub-group 2a; and $\nu 2a$ is: the Abbe number at the d-line of the aspheric lens in the sub-group 2a.

* * * * *

UNITED STATES PATENT AND TRADEMARK OFFICE
CERTIFICATE OF CORRECTION

PATENT NO. : 5,363,243
DATED : November 8, 1994
INVENTOR(S) : Takayuki Ito and Nobutaka Minefuji It is certified that error appears in the above-indentified patent and that said Letters Patent is hereby corrected as shown below:

On the title page: Item [75]

Delete "Ito Takayuki; Minefuji Nobutaka", and insert --Takayuki Ito; Nobutaka Minefuji".

Signed and Sealed this

Sixteenth Day of April, 1996

*Attest:*

BRUCE LEHMAN

*Attesting Officer*   *Commissioner of Patents and Trademarks*